US011440366B1

United States Patent
O'Shea et al.

(10) Patent No.: US 11,440,366 B1
(45) Date of Patent: Sep. 13, 2022

(54) FREQUENCY DEPENDENT PRESSURE AND/OR FLOW FLUCTUATION MITIGATION IN HYDRAULIC SYSTEMS

(71) Applicant: ClearMotion, Inc., Billerica, MA (US)

(72) Inventors: Colin Patrick O'Shea, Boston, MA (US); Joseph Thomas Belter, Somerville, MA (US); Brian Alexander Selden, Concord, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 16/590,996

(22) Filed: Oct. 2, 2019

Related U.S. Application Data

(60) Provisional application No. 62/740,699, filed on Oct. 3, 2018.

(51) Int. Cl.
| | | |
|---|---|---|
| *B60G 17/016* | (2006.01) | |
| *B60G 13/08* | (2006.01) | |
| *B60G 17/08* | (2006.01) | |

(52) U.S. Cl.
CPC ........... *B60G 17/016* (2013.01); *B60G 13/08* (2013.01); *B60G 17/08* (2013.01); *B60G 2202/24* (2013.01); *B60G 2202/42* (2013.01); *B60G 2400/10* (2013.01)

(58) Field of Classification Search
CPC ...... B60G 17/016; B60G 17/08; B60G 13/08; B60G 2202/42; B60G 2400/10; B60G 2202/24
See application file for complete search history.

(56) References Cited

U.S. PATENT DOCUMENTS

| | | | | |
|---|---|---|---|---|
| 2,213,819 A | * | 9/1940 | Krueger | B60G 17/08 267/64.22 |
| 3,677,561 A | * | 7/1972 | McNally | B60G 13/08 280/124.157 |
| 3,756,330 A | * | 9/1973 | Russell, Jr. | E21B 7/021 173/44 |
| 4,159,756 A | * | 7/1979 | Murakami | F16F 9/44 188/282.5 |

(Continued)

FOREIGN PATENT DOCUMENTS

| | | |
|---|---|---|
| WO | 2011/159874 A2 | 12/2011 |
| WO | 2014/145018 A2 | 9/2014 |

(Continued)

OTHER PUBLICATIONS

[No Author Listed], Inline Pulse-ToneTM Hydraulic Shock Suppressors. Catalog HY10-1630/US. Parker Hannifin Global Accumulator Division United States. Retrieved from the WayBack Machine on Mar. 8, 2019, noting date of Nov. 22, 2015. pp. 71-80.

(Continued)

*Primary Examiner* — Frank B Vanaman
(74) *Attorney, Agent, or Firm* — Wolf, Greenfield & Sacks, P.C.

(57) ABSTRACT

Active suspension systems including actuators with combinations of accumulators and flow restrictions, as well as their methods of operation, are described. In some embodiments, methods and constructions for mitigating pump ripple and/or resonances between different hydraulic components are also described.

15 Claims, 8 Drawing Sheets

(56) References Cited

U.S. PATENT DOCUMENTS

| | | | | |
|---|---|---|---|---|
| 4,367,882 | A | * | 1/1983 | Alexander ............. B62K 25/08 |
| | | | | 188/272 |
| 4,921,080 | A | * | 5/1990 | Lin .................... B60G 17/0152 |
| | | | | 188/266.5 |
| 5,175,687 | A | * | 12/1992 | Tsutsumi ......... B60G 17/01941 |
| | | | | 280/5.515 |
| 5,642,899 | A | * | 7/1997 | Inoue ................... B60G 17/015 |
| | | | | 188/266.2 |
| 2002/0121416 | A1 | * | 9/2002 | Katayama ............... F16F 9/064 |
| | | | | 188/314 |
| 2009/0260935 | A1 | | 10/2009 | Avadhany et al. |
| 2010/0072760 | A1 | | 3/2010 | Anderson et al. |
| 2010/0262308 | A1 | | 10/2010 | Anderson et al. |
| 2014/0156143 | A1 | * | 6/2014 | Evangelou ......... B60G 17/0157 |
| | | | | 701/37 |
| 2014/0195112 | A1 | * | 7/2014 | Lu ..................... B60G 17/0165 |
| | | | | 701/37 |
| 2014/0250877 | A1 | * | 9/2014 | Bissbort ................ F15B 11/003 |
| | | | | 60/393 |
| 2014/0265168 | A1 | | 9/2014 | Giovanardi et al. |
| 2017/0253101 | A1 | * | 9/2017 | Kuriki .................... B60G 17/08 |
| 2018/0015802 | A1 | * | 1/2018 | Jeong ................. B60G 17/0182 |

FOREIGN PATENT DOCUMENTS

| | | |
|---|---|---|
| WO | 2017/184651 A1 | 10/2017 |
| WO | 2017/210492 A1 | 12/2017 |

OTHER PUBLICATIONS

Corbo et al., Practical design against pump pulsations. Proceedings of the Twenty-Second International Pump Users Symposium. Conference date: Feb. 2005. pp. 137-177.

McGehee et al., Hydraulic accumulators tame shock and vibration. News content from Machine Design, Mar. 2, 2011. 9 pages.

Minav, Axial piston pump flow ripple compensation by adjusting the pump speed with an electric drive. The twelfth Scandinavian International Conference on Fluid Power, May 18-20, 2011. Tampere, Finland.

Wachel et al., Understanding how pulsation accumulators work. Reprinted from Pipeline Engineering Symposium, Jan. 10-13, 1988, PD—vol. 14. pp. 23-31.

* cited by examiner

FREQUENCY DEPENDENT PRESSURE AND/OR FLOW FLUCTUATION MITIGATION IN HYDRAULIC SYSTEMS

RELATED APPLICATIONS

This application claims the benefit of priority under 35 U.S.C. 119(e) of U.S. Provisional Application Ser. No. 62/740,699, filed Oct. 3, 2018, the disclosure of which is incorporated herein by reference in its entirety.

FIELD

Disclosed embodiments are related to hydraulic systems including frequency dependent pressure and/or flow fluctuation mitigation.

BACKGROUND

Hydraulic systems, which take advantage of fluids to store, convert, and/or transmit power, are utilized across a variety of industries and applications, from large scale industrial plants to motor vehicles. These hydraulic systems may generally include a variety of components, such as, for example, hydraulic pumps, valves, various reservoirs or accumulators, tanks, fluid chambers, filters, membranes, and other hydraulic components. Additionally, each component of a hydraulic system may be connected by flow-couplings that may provide a flow path using a number of different types of components including, for example, pipes, tubes, nipples, hoses, and channels which may have varying diameters and geometries. The flow of hydraulic fluid through and/or between these various components and connections may result in fluid pressure and/or flow fluctuations that may produce vibrations of the components and/or acoustic noise. This may be undesirable due to the generation of objectionable levels of noise and/or accelerated wear and tear on equipment.

SUMMARY

In one embodiment, an actuator has a housing including a first volume and a second volume, a piston slidably disposed between the first volume and second volume, a piston rod attached to the piston, and a hydraulic device fluidly coupled to the first volume and the second volume along a first flow path extending between the first volume and the second volume. An electric motor/generator is operatively coupled to the hydraulic device, a first flow through accumulator disposed along the first flow path between the hydraulic device and the first volume, and a second flow through accumulator disposed along the first flow path between the hydraulic device and the second volume. The actuator also includes at least one flow restriction disposed along the first flow path.

In another embodiment, an active suspension system includes at least one compliant mount and at least one actuator. The at least one actuator has a housing including a first volume and a second volume with a piston slidably disposed between the first volume and second volume, a piston rod attached to the piston and the at least one compliant mount, a hydraulic device fluidly coupled to the first volume and the second volume along a first flow path extending between the first volume and the second volume, and an electric motor/generator operatively coupled to the hydraulic device. The at least one actuator is constructed and arranged to respond within an operating frequency range. Further, a combination of the top mount, the piston, and the piston rod have a first resonant frequency when the actuator is filled with a gas, and the combination has a second resonant frequency when the actuator is filled with hydraulic fluid. The first resonant frequency is outside the operating frequency range of the actuator and the second resonant frequency is less than the first resonant frequency and is within the operating frequency range of the actuator.

In yet another embodiment, an actuator has a housing including a first volume and a second volume with a piston slidably disposed between the first volume and second volume, a hydraulic device fluidly coupled to the first volume and the second volume along a first flow path extending between the first volume and the second volume, and an electric motor/generator operatively coupled to the hydraulic device. The actuator also includes a first accumulator disposed along the first flow path between the hydraulic device and the first volume, at least one second accumulator disposed along the first flow path between the hydraulic device and the second volume, and at least one flow restriction located along the first flow path. The at least one flow restriction damps a resonance between the first accumulator and the second accumulator.

In still another embodiment, an actuator has a housing including a first volume and a second volume with a piston slidably disposed between the first volume and second volume, a hydraulic device fluidly coupled to the first volume and the second volume along a first flow path extending between the first volume and the second volume, and an electric motor/generator operatively coupled to the hydraulic device. The actuator also includes a first flow through accumulator disposed along the first flow path between the hydraulic device and the first volume, a second flow through accumulator disposed along the first flow path between the hydraulic device and the second volume, and a first single port accumulator disposed along the first flow path between the hydraulic device and the second volume.

In a further embodiment, an actuator has a housing including a first volume and a second volume, a piston slidably disposed between the first volume and second volume, a hydraulic device fluidly coupled to the first volume and the second volume along a first flow path extending between the first volume and the second volume, and an electric motor/generator operatively coupled to the hydraulic device. The actuator also includes at least one blow-off valve disposed in the piston to provide selective fluid communication between the first volume and the second volume. The at least one blow-off valve opens when a velocity of the hydraulic device exceeds a threshold rotational velocity.

In another embodiment, a vehicle has an active suspension system including one or more actuators. Each actuator comprises a housing including a first volume and a second volume with a piston slidably disposed between the first volume and second volume, a hydraulic device fluidly coupled to the first volume and the second volume along a first flow path extending between the first volume in the second volume an electric motor/generator operatively coupled to the hydraulic device, a second flow path extending between the first volume and the second volume that bypasses the hydraulic device, and a valve that selectively permits flow through the second flow path based at least partly on a comparison of an operating parameter of the vehicle and a predetermined threshold.

In still another embodiment, a method of operating an actuator of an active suspension system includes: flowing fluid between a first volume and a second volume of an actuator through a hydraulic device along a first flow path extending between the first volume and the second volume during a first mode of operation; and flowing at least a portion of the fluid along a second flow path that bypasses the hydraulic device during a second mode of operation based at least partly on a comparison of an operating parameter of the vehicle and a predetermined threshold.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
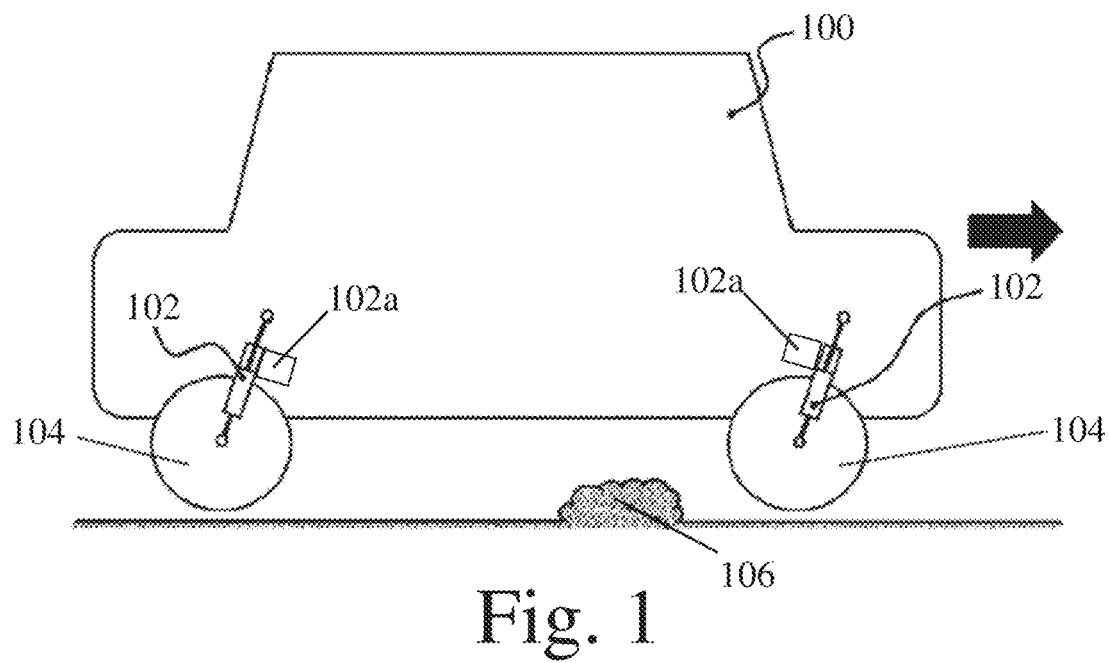
FIG. 1 is one embodiment of a vehicle including an active suspension system including multiple active suspension actuators.

Hydraulic pressure fluctuations may be introduced into a hydraulic system in a number of ways. For example, energy may be input to a hydraulic system either by internal inputs such as a hydraulic device (e.g., a hydraulic motor or hydraulic pump) as well as external inputs such as road disturbances and inertial effects. In one specific example, flow pulsations may be introduced in input flows and/or output flows generated by use of a positive displacement hydraulic device. In another example, in some hydraulic systems, fluctuations in pressure and/or flow may be introduced to the system by the opening or closing of valves or by energy exchange with the environment. These input pressure and/or flow fluctuations may also induce other types of fluctuations as well including, for example, resonances between one or more hydraulic components of a system. Other types of inputs that may result in pressure and/or flow fluctuations within a hydraulic system are also possible as the disclosure is not limited to only these types of inputs.

In view of the above, the Inventors have recognized that hydraulic systems may experience undesirable vibrations and/or acoustic noise in response to the various sources of fluid pressure and/or flow fluctuations. For example, as detailed further below, the operation of the hydraulic device of an active suspension actuator to produce a pressure differential across a piston to provide a desired force, and/or the interaction of the suspension system and/or other vehicle components (e.g., upper and/or lower compliant mounts such as top mounts and bushings), may produce fluid pressure fluctuations that result in vibration and/or audible acoustic noise being transmitted to a body of the vehicle. Accordingly, the Inventors have further recognized that the use of one or more properly sized and located hydraulic components in a hydraulic system, may mitigate the magnitude of flow and/or pressure fluctuations in the system in one or more frequency bands of interest and/or shift a frequency at which these fluctuations occur to a different frequency range where they may be of less concern and/or where increased damping may be present in the shifted frequency range. In some embodiments, the reduced flow and/or pressure fluctuations in one or more portions of the system may be associated with, and/or cause, reduced flow and/or pressure fluctuations being applied, for example, across a piston of an actuator. This reduction in flow and/or pressure fluctuations may result in reduced transfer of these disturbances to the piston rod and other associated structures (e.g., the top mount and the vehicle body). However, in certain embodiments, one or more of the additional hydraulic components may interact with other components within the hydraulic system, and/or components operatively coupled to the hydraulic system such as top mounts and bushings of a vehicle, to amplify pressure and/or flow fluctuations in certain frequency ranges by creating one or more additional hydraulic resonances between the various components. Accordingly, the Inventors have recognized the benefits associated with balancing the design parameters of the various components of a hydraulic system to reduce the overall pressure and/or flow fluctuations within the system over one or more frequency bands. Further, in some embodiments, two or more properly sized and located components within the hydraulic system may function in a synergistic manner to reduce the pressure and/or flow fluctuations in the hydraulic system to a degree that the different components would be unable to achieve individually.

When selecting the properties of various components of a hydraulic system, the overall design may take into account considerations beyond simply reducing pressure and/or flow fluctuations within selected frequency ranges of the hydraulic system. For example, when altering the damping and/or resonance characteristics of a hydraulic system in one frequency range, it is possible that pressure and/or flow fluctuations may be increased in other frequency ranges. Additionally, these modifications may affect the force versus velocity relationship for the overall hydraulic system operation. Accordingly, when balancing the overall design of a hydraulic system considerations that may be taken into account may include, but are not limited to: providing a desired force versus velocity relationship for the actuator; providing a desired force versus pressure differential relationship; reducing the occurrence of excessive harshness in a hydraulic system (e.g. vibration and noise being transmitted to a vehicle body by an active suspension system);

damping or blocking pressure and/or flow fluctuations at frequencies at which they are generated; shifting selected resonance frequencies so they can either be damped more easily and/or such that they do not excite resonances in other parts of an associated structure such as a vehicle structure; and/or any other appropriate considerations.

In view of the above, in one embodiment, it may be desirable to alter a pressure and/or flow fluctuation frequency, such as a resonance frequency, of one or more components of a hydraulic system to a different frequency such that their effects on a radiated noise, vibration, and/or other observable effect on an associated vehicle structure may be at least partially mitigated at this shifted frequency. For example, pressure and/or flow fluctuations at this shifted frequency may be more effectively damped due to increased damping in the shifted frequency range, be outside a frequency range of concern for the hydraulic system (e.g., outside the range of human perception or sensitivity of the vehicle structure), and/or the shifted frequency may be within a response frequency range of an actuator. In embodiments where the shifted frequency is within a response frequency range of the actuator, this may permit the system to be driven in a manner to actively mitigate the resulting vibrations of the pressure and/or flow fluctuations. As detailed further below, a resonance frequency of a hydraulic system may be tuned by controlling the effective mass, which may be related to an associated fluid inertance, and compliances associated with one or more components of the hydraulic system. For example, increasing the effective mass of one or more components by increasing fluid inertance associated with the one or more components may decrease the resonant frequency at which the one or more components vibrate and decreasing the fluid inertances associated with the one or more components may result in increased resonance frequencies. These resonant frequencies may generally be observed as amplified pressure fluctuations in one or more portions of a hydraulic system relative to a desired nominal pressure.

As used herein, the term "effective mass" may refer to the mass one would expect of a component undergoing a resonant vibrational motion at a given natural frequency when associated with a given compliance. For example, a component may undergo a resonant vibrational motion at a natural frequency that is different from a frequency that would be expected given the actual mass of the component and the associated compliance. In one such embodiment, a fluid inertance may increase the effective mass, relative to the actual mass, of one or more mechanical components undergoing oscillation, for example, due to a pressure fluctuation that drives the oscillation. In some embodiments, the increase in the apparent mass may be due to the fluid inertance resisting movement of the component. For example, motion of a mechanical component that dynamically interacts with a liquid (e.g., hydraulic fluid), such as a piston or other appropriate component, may induce fluid flow. The fluid inertance of the fluid undergoing fluid flow due to physical motion of, for example, the piston, or other appropriate mechanical component, may increase the effective mass of the mechanical component relative to its physical mass. Thus, for a given force applied to the one or more components of a hydraulic system, movement of the one or more components may respond to the applied force as if the one or more components had a different "effective mass" than the actual mass of the one or more components. Thus, the one or more components may vibrate at a natural frequency that is different from the natural frequency of the one or more components if the fluid inertance was not present or effectively not present.

In a specific embodiment employing the above noted concepts, an active suspension system of a vehicle may include an actuator and a compliant component, such as a top mount, bushing, strut mount, and/or any other appropriate component, interposed between an attachment point of the actuator and the vehicle body. In such an embodiment, the top-mount may have a stiffness that provides desirable vehicle dynamic attributes. However, the top-mount stiffness may also provide a compliance on which the rod, and other mechanically attached elements such as the piston, may act. This combined system of a piston rod and associated piston may resonate at a frequency determined by the compliance of the top mount and the effective mass of the rod and piston. This resonance may be excited by flow and/or pressure fluctuations input to the system from an internal source such as a pump and/or external inputs such as road disturbances apply to the wheels of the vehicle. Typically, the rod and top mount may resonate with a frequency between about 80 Hz and 300 Hz, 100 Hz to 220 Hz, and/or other ranges depending on the particular mass and compliance of the associated components and system. In some instances, this resonance may be undamped which may lead to force amplification at these frequencies, and in neighboring frequencies, by a relatively large factor up to about five times. At frequencies higher than this resonant frequency, forces transmitted through the top mount to the body of a vehicle may be lower than they would be without this mount as the system acts like a vibration isolation device and the transmitted force may "roll off" which may be desirable for reducing high frequency force transmission.

In view of the above, one or more mechanical components of an actuator, such as a rod and associated piston attached to a top mount, or other compliant component, may act as a spring mass oscillator with a first resonant frequency when fluid inertance effects, which may increase the effective mass of the system, are neglected. In certain embodiments, the amplitude of the oscillations of those one or more components in combination with the top mount at this first frequency may be larger than desired which may result in the transmission of objectionable levels of vibration to the vehicle body. Therefore, it may be desirable to alter the construction and/or operation of the actuator to lower the resonant frequency of the combination of the top mount, or other compliant mount or component, and the one or more components attached to it to a second lower resonant frequency. As noted above, altering the resonant frequency of the combined actuator and compliant mount may be accomplished by increasing an effective mass of the one or more components attached to the compliant mount using an associated fluid inertance to provide a desired second resonant frequency which in some embodiments may be less than the first resonant frequency. Further, by lowering the resonant frequency, the magnitude of vibrations at the higher first frequency range may also be reduced.

In the above embodiment, when taking into account an effective mass of the combination of a top mount, piston, and piston rod, such as when the actuator is filled with hydraulic fluid, the second resonant frequency may be less than the above noted first resonant frequency. In a particular embodiment, the second resonant frequency may be greater than or equal to 40 Hz, 50 Hz, 60 Hz, 70 Hz, and/or any other appropriate frequency. The second resonant frequency may be less than or equal to 120 Hz, 100 Hz, 90 Hz, 80 Hz, 70 Hz, and/or any other appropriate frequency. Combinations of the above frequency ranges are contemplated including a second resonant frequency that is between or equal to 40 Hz and 120 Hz, 70 Hz and 90 Hz, 80 Hz and 90 Hz, and/or any other appropriate frequency range both greater than and less than those noted above. This second resonant frequency may be measured when the actuator is filled with hydraulic fluid.

As noted above, when disregarding the effective mass of a system, such as when the effects of fluid inertance are not present, the combination of a top mount, piston, and piston rod may have a first resonant frequency. This first resonant frequency may be greater than or equal to 100 Hz, 110 Hz, 120 Hz, 130 Hz, 140 Hz, and/or any other appropriate frequency. Correspondingly, the first resonant frequency may be less than or equal to 300 Hz, 250 Hz, 200 Hz, 180 Hz, 160 Hz, 140 Hz, and/or any other appropriate frequency. Combinations of the foregoing are contemplated including, for example, a first resonant frequency that is between or equal to 100 Hz and 300 Hz, 140 Hz and 160 Hz, and/or any other appropriate frequency range including ranges both greater and less than those noted above.

In view of the above, the one or more flow restrictions and/or the compliances associated with an actuator may be selected such that the resulting resonance of a piston and piston rod from the increased effective mass from inclusion of the one or more flow restrictions may be shifted to a lower frequency range by an amount that is greater than or equal to 20%, 30%, 40%, 50%, and/or any other appropriate percentage less than a resonance frequency of the piston and piston rod without the inclusion of the one or more flow restrictions. Correspondingly, the resonance frequency of the piston and piston rod may be decreased by an amount that is less than or equal to 90%, 80%, 70%, 60%, 50%, and/or any other appropriate percentage less than the resonance frequency of the piston and piston rod without the one or more flow restrictions. Combinations the foregoing are contemplated including, for example, resonance frequencies of the piston and piston rod that are between about 20% and 90% less than a resonance frequency of the piston and piston rod without the inclusion of the one or more flow restrictions. Of course it should be understood that actuators may be constructed with piston and piston rod resonance frequency shifts that are both greater than and less than those noted above as the disclosure is not limited in this fashion.

While particular frequency ranges have been given above, in some embodiments, a second resonant frequency of a combination of the top mount, piston, and piston rod associate with an effective mass of this combined system may be some percentage less than the noted first resonant frequency when fluid inertance effects are ignored. For example, a second resonant frequency may be less than the first resonant frequency by more than or equal to 5%, 10%, 20%, and/or any other appropriate percentage. Correspondingly, the second resonant frequency may be within or equal to 50%, 40%, 30%, 20%, and/or any other appropriate percentage less than the first resonant frequency. Combinations of the foregoing ranges are contemplated including, for example, a second resonant frequency that is between 5% and 50% less than the first resonant frequency.

The first and second resonant frequencies discussed above may be determined in a number of different ways without limitation. For example, a first natural frequency neglecting the effective mass of a system due to the presence of fluid inertance effects may be determined simply by using the square root of the ratio of the compliance of the top mount, or other compliant mount to a structure, and the combined actual masses of the rod and piston. Alternatively, in some instances, the first resonant frequency of the combined top mount, piston, and piston rod, or other combination of physical components, may be approximated by measuring a resonant frequency of the combined system using a dynamo while the actuator is filled with a compressible gas such as air, or a similar compressible gas, at approximately 20° C. and 1 atmosphere of pressure. Without wishing to be bound by theory, such a state may approximate the resonant frequency of the combined top mount, piston, and piston rod if the actuator was filled with hydraulic fluid but not constructed to actively alter the resonant frequency of these combined components to be within a desired frequency range. Correspondingly, a second resonant frequency of the combined top mount, piston, and piston rod may be measured using a dynamo when the system is filled with hydraulic fluid, which will include the increased effective mass of the piston and piston rod, thus lowering the second resonant frequency relative to the first resonant frequency which is measured without taking into account the increased effective mass of the system from inclusion of the hydraulic fluid.

As noted previously, in some embodiments, a resonant frequency of a compliant component, such as a top mount, combined with a piston rod and/or piston may be controlled using the effective mass of the piston rod and piston as well as the compliance of the top mount to be within a desired frequency range. In one embodiment, this frequency range may correspond to frequencies in which increased damping is present within the combined top mount and actuator as compared to the unmodified resonant frequency of the combined system. However, in some embodiments, it may also be desirable to actively mitigate pressure and/or flow fluctuations created by the above-noted resonance. In such an embodiment, it may be desirable to control a resonant frequency of the combined compliant component, piston rod, and/or piston to be within an operational frequency range of the overall actuator. For example, the actuator may be operated to actively mitigate resonances induced in the combined system. It should be noted that a particular type of resonance and/or hydraulic pressure fluctuation frequency may be considered to be within an operating frequency range of an actuator if the frequency is less than or equal to a maximum possible frequency response bandwidth of the actuator. The actuator response may be controlled using any appropriate control methodology including, but not limited to, closed-loop and/or open-loop control methods.

Depending on the particular embodiment, an actuator may have a maximum response frequency that is greater than or equal to 5 Hz, 10 Hz, 20 Hz, and/or any other appropriate frequency range. Correspondingly, the actuator may have a maximum response frequency that is less than or equal to 120 Hz, 100 Hz, 50 Hz, 40 Hz, 30 Hz, 20 Hz, and/or any other appropriate frequency range. Combinations of the above noted frequency ranges are contemplated including, an actuator that it is capable of responding with a maximum frequency response that is between or equal to 5 Hz and 120 Hz, 40 Hz and 120 Hz, 5 Hz and 30 Hz, and/or any other appropriate frequency range in which a combined top mount, piston rod, and piston may resonate.

A number of different exemplary frequency ranges are noted both above and in the remainder of the application. These exemplary frequency ranges include various types of resonances, operating frequencies, and other frequency ranges. However, the current disclosure is not limited to only these frequency ranges. Accordingly, it should be understood that systems exhibiting resonances as well as pressure and/or flow fluctuations with different frequency ranges both greater than and less than those noted herein are contemplated as the disclosure is not limited in this fashion.

While certain hydraulic components may be incorporated in a hydraulic system to reduce the effects of, for example, various pump and/or environmentally induced resonances, the presence of these additional components may actually introduce other resonances as well. Therefore, it may be desirable to design a system to take into account, and/or damp, these additional resonances that may be introduced when trying to mitigate other resonances and/or sources of pressure and/or flow fluctuations. For example, in one embodiment, an actuator may include a housing with a first volume and a second volume defined by a piston slidably disposed between the first and second volumes. In some embodiments, the actuator may also include a hydraulic device and at least two accumulators in fluid communication with the first and the second volumes. The two accumulators may also be positioned such that they are in fluid communication with opposing sides of the hydraulic device. For example, the two or more accumulators may include two accumulators that are separately in fluid communication with separate portions of a flow path that are connected to opposing sides of the hydraulic device and/or the first and second volumes. In either case, these accumulators may help to reduce pressure and/or flow fluctuations (i.e., flow and pressure ripple) generated by the hydraulic device. For example, the accumulators may be constructed to have appropriate volumetric compliances, i.e., a change in pressure for a given volume change of the accumulator, to maintain the pressure and/or flow fluctuations generated by the hydraulic motor pump to be less than a certain magnitude. However, the presence of these compliances along with the rotating inertia of the pump may create a rotational system resonance, which in some instances may be between about 10 Hz to 18 Hz depending on the compliance of the accumulators. In applications such as active suspension systems, this resonance may amplify the force vs. velocity of the actuator across the noted frequency range which may result in an excessive force vs. velocity relationship at these frequencies including, at a "wheel hop" frequency of about 12 Hz which may result in undesirable forces being transmitted to the wheel and/or body of a vehicle. Without wishing to be bound by theory, this particular resonance may be due to the flow of additional fluid through a hydraulic device between accumulators located on opposing sides of the hydraulic device which may cause fluctuations in the hydraulic device's speed. Accordingly, the actuator may be designed to include a combination of fluid inertances and/or flow restrictions that may damp this resonance and/or shift the resonance to a desired frequency range such as within an operational frequency range of the actuator and/or within a frequency range that is damped more effectively by one or more components in the actuator and/or an associated system connected to the actuator.

In addition to the above, the Inventors have also recognized that the inclusion of a third accumulator located along one of the flow paths associated with the first and/or second accumulators coupled to opposing sides of a hydraulic device may also help reduce the frequency at which a rotational resonance of the actuator occurs. Without wishing to be bound by theory, the third accumulator may add a desired amount of additional compliance to the hydraulic system to reduce the frequency of the noted rotational resonance of the hydraulic device to be less than or equal to a desired frequency. For example, the third accumulator may help to maintain a volumetric stiffness ratio between the opposing sides of the hydraulic device to be more equal which may result in less pressure change along the flow path including the third accumulator for a given pressure differential across the hydraulic device. The average and peak volumetric stiffness of the associated accumulator located along the same flow path as the third accumulator may therefore be lower in some embodiments which may also result in the associated pressure and/or flow ripple from the hydraulic device being shifted to less than a desired threshold frequency. Without wishing to be bound by theory, the third accumulator may be viewed as a flow divider similar to a current divider in an electrical circuit where the flow is split into parallel paths which may reduce the overall flow impedance to reduce the resonance frequency of the overall hydraulic actuator. In some embodiments, the above noted threshold frequency may be less than about 10 Hz which may also reduce the magnitude of forces transmitted to the wheels and/or body of a vehicle in the frequency range between about 10 Hz and 18 Hz.

In view of the above, in one embodiment, an actuator may have a housing that again includes a first volume and a second volume defined by a piston slidably disposed there between. A hydraulic device may be fluidly coupled to the first and second volumes along a first flow path that passes through the hydraulic device and fluidly couples the first and second volumes. The system may also include at least two flow through accumulators disposed on either side of the hydraulic device along the first flow path between the first and second volumes. A third accumulator may also be disposed along and be in fluid communication with the first flow path at a location between the hydraulic device and the first and/or second volume. In some embodiments, the third accumulator may be a single port accumulator. Further, the third accumulator may be disposed along the first flow path at a location along the flow path that is between a first flow through accumulator and the first volume. The first volume may be an extension volume of the actuator with an associated piston rod extending from a piston through the extension volume to an exterior of the actuator.

As noted above, the inclusion of accumulators on opposing sides of a hydraulic motor pump may induce a rotational resonance within the system. Accordingly, in addition to attempting to shift a resonance frequency of the actuator, it may also be desirable to increase an amount of damping of the system within one or more frequency ranges. For example, flow into and out of one or more of the above noted accumulators may be restricted to damp this resonant mode. Without wishing to be bound by theory, this may reduce the force vs. velocity relationship of the actuator within certain frequency range, including frequencies between about 6 Hz and 18, 6 Hz and 8 Hz, 10 Hz and 18 Hz, and/or any other appropriate frequency range. In some embodiments, these frequency ranges may be relevant for the transmission of forces to the wheels and/or body of a vehicle. Accordingly, in one specific embodiment, an actuator may include at least one flow restriction at a location disposed along the first flow path between the first volume and the second volume of the actuator. For example, flow restrictions may be included at locations between the hydraulic device and the various accumulators, between the various accumulators and the first and/or second volumes, at an inlet and/or outlet of the accumulators, between the accumulators, combinations of the above, and/or any other appropriate arrangement. Further, the one or more flow restrictions, as well as the corresponding compliances and volumes of the accumulators, may be appropriately selected so as to damp out pressure fluctuations generated by, for example, the hydraulic device of the system and/or resonances between the various components of the system. In some embodiments, multiple restrictions may be included in two or more of these locations to provide improved damping for the overall system. For example, two or more sources of pressure and/or flow fluctuations present in an actuator may be damped through the use of these separate flow restrictions. Specific combinations and arrangements of these flow restrictions and compliances are described further below.

Without wishing to be bound by theory, a flow restriction may restrict the ability of a fluid to pass through the restriction. Therefore, a flow of fluid through a flow restriction may exhibit a relationship between pressure and flow such that increased flow resistance is associated with increased pressures for similar flow rates through the flow restriction. While flow through any hydraulic component and/or flow path may offer some amount of flow resistance, not every flow line or hydraulic component is typically considered to be a flow restriction.

In some embodiments, when flow restrictions are combined with an appropriately tuned compliance and/or inertance in a hydraulic system the flow restriction may also function to exclude, i.e., damp, pressure and/or flow fluctuations within certain frequency ranges. For example, the inertia of fluid within a flow restriction coupled with the resistance to flow of the flow restriction itself resists movement of fluid through the restriction. At low enough frequencies the fluid is able to flow through the flow restriction. However, as the applied fluctuations in pressure and/or flow increase in frequency, the inertia and resistance to flow may restrict the ability of a fluid to pass through the flow restriction and into an associated accumulator. This may result in flow restrictions exhibiting what may be known as a roll-off or cutoff frequency above which a reduced amount of flow may pass through the flow restriction at frequencies above the roll-off or cutoff frequency. Thus, through the appropriate balancing of a flow resistance of one or more flow restrictions and the compliance of one or more associated accumulators, or other compliant component in the hydraulic system, it is possible to cause the one or more flow restrictions to function as low pass filters that permit pressure and/or flow fluctuations below a predetermined threshold frequency to propagate along a flow path with little to no mitigation while at least partially damping the magnitude of pressure and/or flow fluctuations above the predetermined threshold frequency. This behavior may also be viewed as increasing an impedance of the fluid as a function of frequency which may be used to increase an effective mass of an associated hydraulic component, such as a piston, as a function of frequency as well. Thus, the described flow restrictions may be appropriately constructed to provide a desired amount of damping and/or increased fluid impedance for a desired application as described further below in relation to the specific embodiments described herein.

In view of the above, the various flow restrictions described herein may have any appropriate construction capable of providing a desired roll-off or cutoff frequency at a particular location in a hydraulic system. However, in some embodiments, it may be desirable for the pressure drop associated with a particular flow restriction to be an approximately linear pressure drop with increasing flow rate. Without wishing to be bound by theory, this type of flow behavior may be beneficial because it is capable of providing sufficient pressure drop to help damp relatively small flow rates associated with small displacements of a piston as may occur during various types of hydraulic system resonances. For example, in some embodiments, a resonance within a hydraulic system may result in movement of a piston on the order of about 1 micron. Further, the pressure drop at higher flow rates for a linear relationship may still be sufficiently low to permit high speed operation of an actuator. In contrast, non-linear flow behavior, such as quadratic pressure drops, may result in excessively high pressure drops within a hydraulic actuator at higher flow rates which may impede high-rate operation of an actuator. One structure capable of providing this type of flow resistance behavior, which is described further below in regard to the figures, may include a thin annular gap between two cylindrical surfaces similar to Couette flow between two parallel plates. Of course, it should be understood that any appropriate type of flow restriction including, for example, a shim stack, may be used to provide the desired flow properties within a hydraulic system. Additionally, while flow restrictions exhibiting a linear pressure drop with increasing flow rate relationship have been described as being beneficial above in regard to one embodiment, embodiments using flow restrictions exhibiting nonlinear behavior, including quadratic behavior or digressive behavior, are also contemplated as the disclosure is not so limited.

In some embodiments, the damping provided by the one or more flow restrictions included in a hydraulic actuator may be tuned in combination with one another in order to underdamp the movement of an associated piston and piston rod. Without wishing to be bound by theory, under damping the piston and piston rod may help to reduce the peak force experienced due to various types of system resonances and/or from pressure and/or flow fluctuation sources while still permitting an actuator to respond with a desired force versus velocity characteristic within a given frequency range. Otherwise, it would be a simple matter to provide as much damping as possible within a system to eliminate the unwanted pressure and/or flow fluctuations. This balancing of competing effects to provide desired performance characteristics of the actuator while mitigating the occurrence of pressure and/or flow fluctuations within a hydraulic system are elaborated on further below. Of course, embodiments in which the piston and piston rod of an actuator are either critically damped, or over damped, are also contemplated as the disclosure is not limited in this fashion.

Appropriate types of one or more flow restrictions that may be used in the various positions in various embodiments described herein may include, but are not limited to, variable orifices, orifices and/or flow channels with reduced diameters, restrictor valves, flow through annular gaps with a sufficiently narrow gap, shim stacks, capillary tubes, and/or any other component that is appropriately constructed to provide an increased flow resistance and or inertance as compared to the flow resistance of adjacent portions of a particular flow path. Accordingly, it should be understood that the current disclosure should not be limited to any particular type of flow restriction and that a flow restriction may have any appropriate size and/or construction to provide a desired flow resistance and or inertance for an actuator.

While particular actuator housing shapes and constructions are described herein and depicted in the figures, it should be understood that the current disclosure is not limited to any particular housing shape or construction. For example, an actuator housing may include one or more tubes which may have any cross-sectional shape including, but not limited to, circular, ovular, square, and/or any other appropriate shape. In instances where multiple tubes are used, these tubes may be concentrically located with one another in some embodiments. These described actuator housings may also include an internal volume filled with hydraulic fluid. This internal volume may also be divided into first and second volumes, such as a compression volume and extension volume, by a piston slidably received within the internal volume between the first and second volumes.

In order to prevent over speed events of a hydraulic device of an actuator due to, for example, a high-speed vertical road input, some actuators may include a diverter valve that opens at a particular operational flow rate due to movement of the actuator piston to divert the fluid forced out of the actuator by the piston such that it is diverted away from, or around, the hydraulic device. For example, a diverter valve typically circulates the diverted fluid internally between the compression and extension volumes of the actuator. It should be understood that the noted over speed events refer to rotational speeds of the hydraulic device above a predetermined maximum operational rotational speed of the hydraulic device.

The Inventors have recognized that diverter valves may be costly and complex to manufacture, assemble, and/or tune. Therefore, a system that offers over speed protection without the use of a diverter valve may be advantageous in some applications. Specifically, the Inventors have recognized the benefits associated with controlling the operation of a blow-off valve incorporated into an actuator, and which in some embodiments may be incorporated into the piston of an actuator, by controlling the pressure differential within the system versus fluid flow rate. In one such embodiment, an actuator may include one or more flow resistances that create a backpressure due to the corresponding flow of fluid emanating from the first or second volumes within an actuator housing, e.g., a compression and extension volume of an actuator, when the flow from those volumes is above a certain threshold value. This increase in pressure differential, or backpressure, may be configured such that the at least one blow-off valve opens at flow rates that exceed the threshold flow rate to permit the flow of fluid between the first and second volumes of the actuator through an alternate flow path (e.g., through the piston) thus bypassing the hydraulic device. This flow of fluid between the first and second volumes of the actuator that bypasses the hydraulic device may thus help to limit, and/or prevent, over speed events of the hydraulic device.

The Inventors have recognized that when a vehicle operates at relatively low vehicle velocities along, for example a paved road, an associated suspension system of the vehicle may still be exposed to a large number of relatively low amplitude high frequency events. In instances where an active suspension system is used including a hydraulic device used to actuate the one or more actuators of the system, these events may be too small and/or rapid to overcome the inertia of a rotor of the hydraulic device. This may result in the hydraulic device remaining relatively stationary during these events which may lead to the actuator behaving like a rigid connection between the vehicle body or the vehicle sprung mass and wheel assembly or unsprung mass of a system. This may result in a large portion of the energy from these road induced events being transferred from the road to the vehicle body which may increase the harshness of the ride and be detrimental to the ride experience of the vehicle occupants.

In view of the above, the Inventors have recognized that in some embodiments, because there may be less needed to control movement of the vehicle body relative to the ground (e.g., primary motion) for performance considerations at low vehicle velocities, it may be desirable to provide a "softer" ride at these lower vehicle velocities by mitigating the impact of the hydraulic device's inertia on the actuator's operation. Specifically, in one embodiment, an active suspension system may include at least one actuator with a hydraulic device. The hydraulic device may be fluidly coupled to corresponding first and second actuator volumes along a first flow path that pass through the hydraulic device. Additionally, the actuator may include at least a second flow path extending between the first volume and the second volume that bypasses, i.e., does not pass through the hydraulic device. A valve may also be used to selectively permit the flow of fluid through the second flow path based on one or more suspension system and/or vehicle parameters such as the velocity of the vehicle. For example, when the vehicle velocity is less than a threshold vehicle velocity, the valve may open, at least partially, to permit at least a portion of the fluid flowing between the two volumes to flow through the second flow path such that it that bypasses the hydraulic device. Alternatively, or additionally, a valve in the second flow path may be, at least partially opened, when a pressure differential applied across a piston by the hydraulic device is below a certain threshold pressure differential but closed when the pressure differential applied across the piston by the hydraulic device is above the threshold pressure differential. These control strategies may reduce the effect of a hydraulic device's inertia at these slower vehicle velocities and/or under conditions where vehicle body control is less important, such as when the vehicle is travelling straight at low or high speeds. In some embodiments, such a system may provide a softer less harsh secondary ride and a better experience for vehicle occupants. However, when the valve is operated to restrict or eliminate flow in the second flow path, for example when the vehicle is travelling at a higher velocity and/or when a higher torque is being applied to the hydraulic device, the system may provide more responsive actuator operation with greater force authority.

In the above embodiment, a threshold vehicle velocity below which a valve may be operated to at least partially bypass a hydraulic device of an actuator may correspond to any appropriate vehicle velocity depending on the particular design and application. However, in one embodiment, the threshold vehicle velocity may be greater than or equal to 10 miles per hour (mph), 15 mph, 20 mph, 25 mph, and/or any other appropriate velocity. Correspondingly, the threshold vehicle velocity may be less than or equal to 40 mph, 35 mph 30 mph, and/or any other appropriate vehicle velocity. Combinations of the foregoing threshold vehicle velocity ranges are contemplated including, for example, a threshold vehicle velocity that is between or equal to about 15 miles per hour (MPH) and 35 MPH, 20 MPH, 30 MPH, and/or any other appropriate combination. While particular threshold vehicle velocities are noted above, threshold vehicle velocities both greater and less than those listed are also contemplated as the disclosure is not so limited.

In another embodiment, a controller of an actuator may either sense or command a pressure differential across a piston to produce a force to be applied by the actuator. In instances where this applied pressure differential is less than or equal to a threshold pressure differential, as described above, a valve may be operated to at least partially bypass a hydraulic device of an actuator. However, while this valve is open, the actuator may be limited in regard to the magnitude of a pressure differential the actuator is capable of applying across a piston of the actuator. Accordingly, when a sensed or commanded pressure differential is greater than the threshold pressure differential, the valve may be closed such that substantially all of the hydraulic fluid passing between first and second volumes of the actuator may pass through the associated hydraulic device to increase a pressure differential command authority of the actuator. However, in some embodiments it may be desirable to back drive the hydraulic device. Accordingly, in such an embodiment, in at least one mode of operation a threshold pressure differential may be set to zero to permit the valves to be closed while back driving the actuator.

For the purposes of this application, the term hydraulic device may refer to either a hydraulic motor, a hydraulic pump, a hydraulic motor being operated as a pump, or a hydraulic pump being operated as a hydraulic motor. It is understood that in some embodiments of hydraulic systems described herein, hydraulic pumps and hydraulic motors may be used interchangeably. Thus, unless context indicates otherwise a pump, hydraulic motor, and/or hydraulic device may be used interchangeably in this disclosure. Further, depending on the particular application, a hydraulic device may either be operated as a hydraulic motor such that it is driven by a flow of fluid, may be operated as a pump to create or resist a flow of fluid, or may be operated using a combination of these operating modes depending on the particular application. Further, a hydraulic device may be capable of providing fixed displacements, variable displacements, fixed velocities, and/or variable velocities as the disclosure is not limited to any particular device. Appropriate types of hydraulic devices may include, but are not limited to, gerotors, vane pumps, gear pumps, screw pumps, and/or any other appropriate type of hydraulic device.

An electric motor/generator as used herein may refer to either an electric motor and/or an electric generator. In either case, in some embodiments, an associated hydraulic device may actively drive the electric motor/generator such that it functions as a generator to provide damping to a hydraulic actuator while also generating electrical energy. The electric motor/generator may also be actively driven to operate the hydraulic device as a pump to create a flow of fluid to actively drive operation of the actuator and/or resist movement of a piston of the actuator. Depending on the particular embodiment, an electric motor/generator may be operated only as a generator, only as an actively driven motor, and/or as both depending on the particular application. Appropriate types of electric motor/generators may include, but are not limited to, a brushless DC motor such as a three-phase permanent magnet synchronous motor, a brushed DC motor, an induction motor, a dynamo, or any other type of device capable of converting electricity into rotary motion and/or vice-versa.

Various types of accumulators are described in the current disclosure. As used herein an accumulator may refer to a hydraulic component capable of accepting, storing, and subsequently outputting volumes of hydraulic fluid within a desired range of pressures. Appropriate types of accumulators may include, but are not limited to, an air-filled accumulator, bladder accumulator, piston accumulator, spring accumulator, bellows accumulator, and/or any other appropriate type of accumulator construction as the disclosure is not so limited. Further, for purposes of this application an accumulator may have one of two general types of port arrangements. Specifically, the accumulators described herein may correspond to either single port accumulators and/or flow through accumulators. A single port accumulator may include a single port through which fluid both enters and exits a fluid storage chamber of the accumulator during use. A flow through accumulator may include at least two distinct ports through which fluid may enter and exit a fluid storage chamber of the accumulator in either one or both directions. Of course, different types of accumulators with different port arrangements and flow configurations are also contemplated.

It should be understood that the various noted resonances frequencies and other hydraulic pressure fluctuations described herein may be measured in any appropriate fashion. However, in some instances, these parameters may be measured by measuring a pressure in the one or more accumulators of a system (either oil pressure in front of the piston/bladder or gas pressure). A transfer function from actuator velocity measured on a dynamometer to pressure may then be determined using these pressure measurements. Without wishing to be bound by theory, such a transfer function would basically be a flow to pressure transfer function and should include the resonant response in the measured locations. Similarly, a transfer function from pressure in one flow path to pressure in another flow path, or within an accumulator, may also be determined using these measurements and should also include the noted resonant response as well. In some instances, sensors may be located on opposing sides of a flow restriction when making the noted measurements to provide information related to the pressure and/or flow fluctuations present on either side of the flow restriction. Additionally, in some instances, the sensors may include sensors located within and outside of the noted accumulators to provide measurements of fluctuations within and outside of the accumulators.

For the sake of clarity, the actuators described herein are primarily directed to use in an active suspension system of a vehicle. However, the disclosed actuators and methods described herein are not limited to only being applied in an active suspension system. For example, the disclosed actuators may be used in any typical application where a hydraulic actuator is used for applying axial displacements to one or more associated components. Additionally, while the actuators described in the figures below are described as having extension and compression volumes, this disclosure may be generalized to arrangements of hydraulic components having first and second volumes of hydraulic fluid where a piston rod, when located within the housing of the actuator, may pass through one, or both, of the first and second volumes to an exterior of the actuator. Therefore, the current disclosure should not be limited to only the specific actuators depicted in the figures.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts an embodiment of a vehicle 100 including an active suspension system. The active suspension system may include one or more actuators 102, and in some instances, a plurality of actuators. In some embodiments, each actuator may include a separate associated hydraulic device 102a, such as a hydraulic motor and/or pump, used to control the individual actuators. In such an embodiment, each actuator of the active suspension system may be considered a hydraulically independent system that is not hydraulically connected to the other actuators. However, embodiments in which a single hydraulic device is used to power the one or more actuators are also contemplated. Each actuator may be disposed between a wheel assembly 104 and a corresponding portion of the vehicle body or chassis 100. Further, at least one actuator may be associated with each wheel of the vehicle. The actuators may be operated to control movement of the vehicle body due to disturbances from various types of inputs including, for example, the road. For instance, as the vehicle travels along a road the wheels may encounter one or more height disturbances, such as a bump 106, which may result in a force being applied to the wheels that is then transmitted to some degree to the vehicle body.

Figure 2:
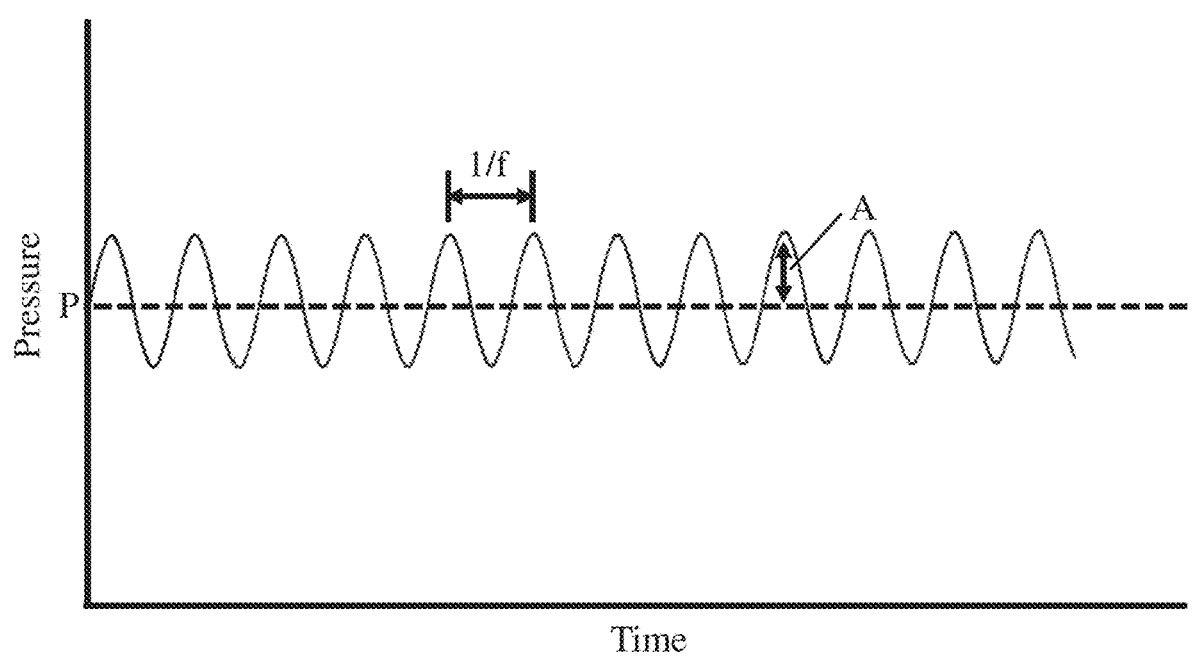
FIG. 2 is a graph depicting a schematic representation of an exemplary pressure fluctuation from a pressure source such as a hydraulic pump.

As noted previously, operation of a hydraulic device may result in the creation of what is known as flow and/or pressure fluctuations or pulsations (e.g., pump ripple). Additionally, resonances induced in one or more components of a hydraulic system may also create other flow and/or pressure fluctuations within the system as well. FIG. 2 depicts a graph of pressure versus time for a pressure fluctuation induced in a hydraulic system, such as a hydraulic actuator, from any appropriate source including, for example, pump ripple, resonance from a combined top mount and rod, rotational resonance of a hydraulic device, and or any other appropriate fluctuation source. In the figure, an average commanded pressure P may be provided at a particular point in a hydraulic system by an associated hydraulic device. This commanded pressure may of course vary over time depending on the desired operation of the actuator. However, as depicted in figure, this commanded pressure may be superimposed with higher frequency pressure fluctuations with a frequency f, period 1/f, and amplitude A. The resulting combined pressure wave may oscillate about the commanded pressure P. These higher frequency pressure fluctuations in the observed pressure wave that arise may be referred to as pressure fluctuations. Returning to FIG. 2, if the pressure fluctuation is able to propagate through an associated flow path, and into the compression and/or extension chambers where a piston is disposed, then the force exerted on the piston may correspondingly fluctuate. This may potentially result in fluctuations in a position of the piston and an associated piston rod. Thus, this ripple may be transferred to the piston rod and to any structure to which the piston rod is attached including, for example, a top mount and/or a vehicle body. This may result in the generation of vibration and audible noise being transmitted to the vehicle body as well. Therefore, as noted above, in some applications, it may be desirable to design a hydraulic system to either mitigate the generation of flow and/or pressure fluctuations, shift one or more resonance frequencies of components of a system to be in a more favorable frequency range, and/or provide increased damping within one or more frequency ranges.

In one instance a pressure and/or flow fluctuation input into a hydraulic system may correspond to pump ripple generated by operation of a hydraulic device such as a hydraulic motor and/or pump. Depending on the particular hydraulic device being used, the frequency of pump ripple, i.e., pressure ripple and/or flow ripple, of the hydraulic device may vary. However, in some embodiments, the fluctuation frequencies may be greater than or equal to 1 Hz, 100 Hz, 200 Hz, 300 Hz, 400 Hz, 500 Hz, 600 Hz, 700 Hz, 800 Hz, 900 Hz, 1000 Hz, 1100 Hz, 1200 Hz, 1300 Hz, 1400 Hz, and/or any other appropriate frequency. Correspondingly, the fluctuation frequencies may be less than or equal to 100 Hz, 200 Hz, 300 Hz, 400 Hz, 500 Hz, 600 Hz, 700 Hz, 800 Hz, 900 Hz, 1000 Hz, 1100 Hz, 1200 Hz, 1300 Hz, 1400 Hz, 1500 Hz, and/or any other appropriate frequency. Combinations of the above ranges are contemplated including, for example, a pump ripple may have a frequency that is between or equal to 1 Hz and 1500 Hz. However, other combinations and frequencies both greater and less than those noted above may also be used as the disclosure is not so limited.

While pump ripple is noted as one possible source of pressure and/or flow fluctuations within a hydraulic system, the disclosure is not limited to only mitigating pump ripple. For example, as previously discussed, several other sources of pressure and/or flow fluctuations which may either be shifted in frequency and/or mitigated to one degree or another, may include, but are not limited to: a resonance of a top mount combined with a piston rod and associated piston; resonances between adjacent accumulators, a rotational resonance of a hydraulic device; as well as other appropriate sources.

Figure 3:
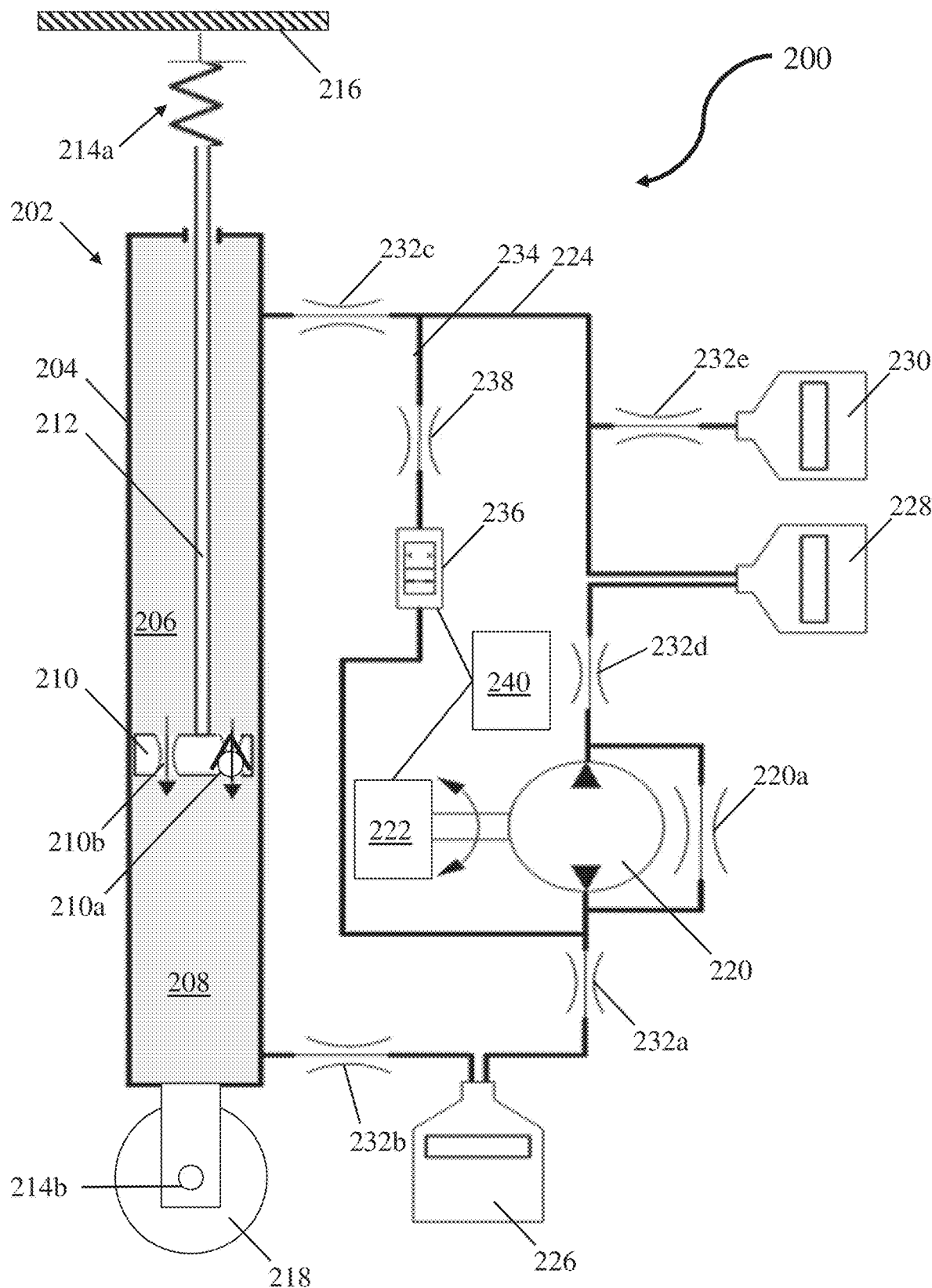
FIG. 3 is a schematic representation of one embodiment of an actuator integrated with an active suspension system.

FIG. 3. depicts a schematic representation of one embodiment of a vehicle active suspension system 200 that is constructed to mitigate the various vibrations, resonances, and/or pump ripple present during operation of the system. As shown in the figure, the suspension system includes an actuator 202 with a housing 204. The actuator may include first and second fluid volumes which may correspond to an extension volume 206 and a compression volume 208 located within the housing of the actuator. The extension volume and the compression volume are located on either side of a piston 210 that is constructed and arranged to slidably move within the housing during an extension stroke and a compression stroke of the actuator. The hydraulic actuator housing may correspond to any appropriate structure including, for example, a hydraulic actuator housing including one or more concentric tubes such as a monotube damper housing, a twin tube damper housing, a tri-tube damper housing, and/or other appropriate housing. In some embodiments, a piston rod 212 may be attached to and extend from one side of the piston. The piston rod may extend through, and out from, at least one end of the actuator housing. As illustrated in the figure, the piston rod may be attached to a structure (e.g., the vehicle body) that the actuator is intended to apply a force to. In this particular embodiment, the piston rod is attached to a top mount 214*a* which is attached to, and disposed between, the vehicle body (i.e., sprung mass) 216 and the piston rod. The actuator housing may also be attached to a lower mount or bushing 214*b* which may be attached to, and disposed between, the actuator housing 204 and a wheel assembly (i.e., unsprung mass) 218 located proximate an end of the actuator housing that is located opposite the piston rod. The actuator may be operated to control the relative motion and forces applied to the wheel and vehicle chassis during vehicle operation. The above connections with the top mount, chassis, lower bushing, and wheel may be direct connections and/or indirect connections as the disclosure is not so limited. In some embodiments, the actuator 202 may be inverted where the piston rod is attached to the wheel assembly and/or bushing and the housing is attached to the top mount or the vehicle body as well.

As also shown in FIG. 3, in some embodiments, the above-described actuator may include a hydraulic device 220 that is in fluid communication with the extension volume 206 and the compression volume 208 of the hydraulic actuator to control actuation of the hydraulic actuator. More specifically, a first flow path 224 may extend between and fluidly couple the extension and compression volumes. The hydraulic device may be positioned such that the first flow path fluidically connects the extension and compression volumes and passes through the hydraulic device. Thus, in a first operating mode, when the hydraulic device is operated in a first direction, fluid flows from the extension volume through the first flow path and the hydraulic device to the compression volume and the hydraulic actuator undergoes an extension stroke. Correspondingly, in a second operating mode, when the hydraulic device is operated in a second direction, fluid flows from the compression volume through the first flow path and hydraulic device to the extension volume and the hydraulic actuator undergoes a compression stroke. Of course, operating modes in which a rod of the actuator is held stationary while the hydraulic device is operated are also possible. Additionally, in some operating modes, at least a portion, or in some instances, substantially all, of a flow of fluid passing between the first and second volumes of an actuator may bypass the hydraulic device. For example, embodiments including one or more blow-off valves, bypass flow paths, and/or fixed diameter orifices are detailed further below. Further, as illustrated in the figure, the hydraulic device may include some amount of leakage through leakage path 220a which may correspond to leakage of hydraulic fluid across the hydraulic device during normal operation.

As noted above, the actuator 200 may also include an electric motor/generator 222 that may be operatively coupled to the hydraulic device 220. The electric motor/generator may either be directly or indirectly coupled to the hydraulic device as the disclosure is not so limited. In either case, the electric motor/generator may be used to apply a torque to the hydraulic device. Further, depending on how the electric motor/generator is controlled, the hydraulic device may either actively drive the hydraulic actuator or resist motion of the actuator by driving the hydraulic device to resist the applied motion and/or by operating the hydraulic device as a generator to provide damping to the hydraulic actuator while also generating electrical energy. In instances where the electric motor/generator is operated as a generator, the hydraulic device may be driven in a particular direction by fluid flowing between the extension volume 206 and compression volume 208 in response to an applied force. In turn, the hydraulic device may drive the electric motor/generator to produce electrical energy. By controlling an impedance, a current (e.g., by using pulse width modulation), and/or any other appropriate input, applied to the electric motor/generator during generation, the damping force applied to the hydraulic actuator may be electronically controlled to provide a range of forces.

Depending on the particular embodiment, a controller 240 may be electrically connected to the electric motor/generator 222. The controller may control one or more inputs of the electric motor/generator in order to control a force generated by the hydraulic actuator during active and/or passive operation (i.e., active extension or compression as well as damping during compression or extension). For example, the controller may command, for example, a position, a voltage, a current, a torque, an impedance, a frequency, a motor velocity, and/or any other appropriate parameter of the electric motor/generator.

As noted previously, when operated, the above-described actuator 202 may experience pump ripple, vibration, and/or various types of resonances. Accordingly, the actuator may include a plurality of accumulators, flow restrictions, and/or other appropriate hydraulic components to mitigate the impact of these phenomena, the interactions of which are described further below. FIG. 3 depicts one embodiment of an actuator including an arrangement of these types of components. In the depicted embodiment, the actuator includes a first accumulator 226, a second accumulator 228, and a third accumulator 230 disposed along, and in fluid communication with, the first flow path 224 extending between the extension volume 206 and compression volume 208 of the actuator. The first and second accumulators may be flow through accumulators disposed along the first flow path on either side of the hydraulic device 220 with the first accumulator fluidly coupled to a first portion of the first flow path between the hydraulic device and the compression volume 208 and the second accumulator fluidly coupled to a second portion of the first flow path between hydraulic device and the extension volume 206. Accordingly, the first flow path passes through the first and second accumulators such that fluid flowing along the first flow path between the compression and extension volumes may flow through the first and second accumulators. The third accumulator may be a single port accumulator that is constructed and arranged such that the port of the third accumulator is in fluid communication with the first flow path along a side branch that is connected to the main flow path through the first flow path. While the third accumulator is depicted as being connected to the second portion of the first flow path between the hydraulic device and the extension volume, embodiments in which the third accumulator is connected to the first portion of the first flow path at a location between the hydraulic device and the compression volume are also contemplated.

In some embodiments, the various compliances and sizing of the different accumulators may be selected such that the first accumulator 226 accommodates a majority of the rod volume introduced into the actuator during at least a portion of a compression stroke in the absence of frequency considerations. Of course, instances in which at least a portion of the rod volume is accommodated by a different accumulator may also occur due to movement of the rod from pressure and/or flow fluctuations within certain frequencies ranges. Further, absent considerations from pressure and/or flow fluctuations, embodiments in which a majority of a rod volume is at least partially accommodated by one or more of the other accumulators within a hydraulic actuator are also contemplated as the disclosure is not so limited.

In the above embodiment, the actuator 202 may include at least one flow restriction located along the first flow path 224. For example, in the depicted embodiment, the actuator includes a first flow restriction 232a, a second flow restriction 232b, a third flow restriction 232c, a fourth flow restriction 232d, and a fifth flow restriction 232e. The first flow restriction is disposed along the first flow path at a location between the hydraulic device 220 and the first accumulator 226. The second flow restriction may be located along the first flow path at a position between the first accumulator and the compression volume 208. The third flow restriction may be located at a position along the first flow path that is between the extension volume 206 and the second and/or third accumulators 228 and 230. The fourth flow restriction may be located along the first flow path at a position between the second accumulator and the hydraulic device. Lastly, the fifth flow restriction may be located between an inlet to the single port accumulator corresponding to the third accumulator 230 and the first flow path. The functionalities and considerations associated with these various restrictions are detailed further below.

Having described the general arrangements of the various hydraulic components of the active suspension system depicted in FIG. 3, the interactions of these components to mitigate, shift, and/or damp the presence of various pressure and/or flow fluctuations within an actuator are detailed further below. For example, in one embodiment, components used to provide pump ripple mitigation may result in the introduction of a rotational resonance of the hydraulic device which may be mitigated through the use of flow resistances and/or the presence of additional components. Additionally, these components may be tuned to provide a desired resonance frequency of a rod connected to an associated top mount or other structure while still providing a desired force and/or displacement response of the actuator. The various components may also be tuned to damp resonances between the various accumulators as well as in addition to any number of other possible considerations. Therefore, it should be understood that while a particular embodiment is described below in regard to the figures, the various components described herein may be tuned in any number of ways to provide varying amounts of pressure and/or flow fluctuation mitigation from multiple sources while also balancing the overall operating parameters of the actuator itself to provide a desired actuator operation.

As noted previously, in at least one embodiment, the combination of the top mount 214a, the piston rod 212, and piston 210 may resonate at a particular frequency in response to various inputs to the hydraulic system. For example, the top mount 214a depicted in the figure may function as a spring and may include at least some minimal amount of damping within certain frequency ranges. Further, the combination of the top mount with the piston 210 and piston rod 212 may have a combined resonance frequency related to the compliance of the top mount and the combined mass of the piston rod and piston. This resonance of the top mount, piston, and piston rod may result in forces being transmitted to a wheel 218 and/or body 216 of a vehicle. Such a resonance may be excited by a number of different force inputs including, for example, road inputs to a wheel of the vehicle which may create pressure and/or flow fluctuations within the internal volume of the actuator. In some instances, the resulting resonance within the system may cause micron level displacements of the piston and piston rod at a frequency that is within a frequency range that is undesirable for either audible noise and/or system vibration considerations.

In view of the above, and as previously discussed, it may be desirable to either reduce the magnitude and/or shift the resonance frequency of the combined mass oscillator corresponding to the top mount, piston rod, and piston to be a within frequency range outside of the noted undesired frequency ranges. For instance, depending on the particular embodiment, it may be desirable to move this resonance frequency to a frequency range that is either of less concern and/or a frequency range in which additional damping may be present. Accordingly, as previously described, in some embodiments, a fluid inertance of the flow path between the compression and extension volumes and the corresponding accumulators may be increased to increase the overall "effective mass" of the piston and piston rod because the fluid within at least a portion of the flow path may accelerate in concert with motion of the piston and piston rod. The increase in effective mass may cause the resonance frequency of the combined piston, piston rod, and top mount to decrease. This increased fluid inertance, and resulting increase in effective mass of the piston and piston rod, may be provided through the use of the various first, second, third, and/or fourth flow restrictions 232a-232d disposed along the first flow path described above. For example, in one specific embodiment, the second flow restriction 232b located between the piston and first accumulator 226 and/or the third flow restriction 232c located between the piston and the second accumulator may be used to increase in amount of fluid inertance along the associated flow paths between the first and second fluid volumes and the associated accumulator. This increased fluid inertance may result in an increased effective mass of the combined piston rod and piston. The increased fluid inertance may also provide low amplitude fluid damping for this resonance mode as well. For example, by adding sufficient fluid inertance (i.e., effective mass), the resonant frequency of the combined mass oscillator of the top mount and piston rod/piston may be shifted downward to a lower frequency for the same top mount stiffness and the corresponding fluid damping may reduce the peak forces enough to be inaudible based on the response of the vehicle to force input. Additionally, by appropriately balancing the amount of damping used to reduce the resonant peak force the previously described high frequency roll-off effect of the overall system may largely be preserved as an overdamped system tends to exhibit less amplitude roll-off over the same frequency range.

In the above embodiment, either one, or both, of the second and third flow restrictions 232b and 232c may damp pressure created at the hydraulic device from reaching the piston. Specifically, the fluid inertance together with the stiffness of the fluid on each side of the flow restrictions may create an internal fluid resonance at a frequency threshold which, depending on the embodiment, may be between about 100 Hz and 200 Hz, 100 Hz and 300 Hz, and/or any other appropriate frequency range. At frequencies below this frequency threshold, pressures at the piston-side of either one or both of these restrictions may be equal to pressure at the hydraulic device side of the flow path except for any pressure loss due to flow rate that is largely frequency independent (i.e., standard pressure loss). At frequencies above this threshold frequency, the pressure at the piston side of either one or both of these restrictions may be lower than the pressure at the hydraulic device side of the restrictions. As outlined further below, the roll-off behavior of either one or both of these flow restrictions may be governed by a $2^{nd}$ order resonance of the associated flow restriction along with the compliance of the surrounding fluid. The damping may be related to the flow loss characteristics of the associated flow restriction and may serve to balance the desirable roll-off behavior with the amplitude of the peak resonance force. In this way, for small amplitudes and frequencies higher than this threshold frequency, the pressure at the piston may be generally lower than the pressure at the hydraulic device. Thus, either one or both of these flow restrictions may also damp the top mount resonance within this shifted frequency range as discussed above. If this amount of damping were instead designed into the top-mount, a similar top-mount/rod resonance damping level may be achieved but the overall high frequency forces transmitted to an associated wheel and/or vehicle body may be higher due to the lack of pressure roll-off behavior internal to the fluid path itself.

While the above noted embodiment refers specifically to the second and third flow restrictions 232b and 232c, it should be understood that any flow restriction, or combination of flow restrictions, located between a hydraulic device 220 and one or more sides of a piston 210 may be used to provide a desired amount of increased effective mass for a combined piston rod 212 and piston 210. Accordingly, it should be understood that the inclusion of multiple flow restrictions in multiple locations within the overall hydraulic system may be advantageous in that it may permit each of the flow restrictions to be tuned both individually and in combination to address the various types of pressure and/or flow fluctuations present in a hydraulic system.

While the above noted flow restrictions may help to shift and/or mitigate resonances at certain frequencies, the flow restrictions may also affect other operating parameters of an actuator. For example, the damping of the overall actuator from these flow restrictions may act at all frequencies and velocity levels which may create a base damping in the system that may generally be undesirable. For example, and without wishing to be bound by theory, this additional damping may add force to the force versus velocity curve of the actuator at substantially all frequencies. Therefore, the presence of this additional damping may be balanced against other considerations such as the introduction of other resonances and/or a desired force versus velocity response of the actuator.

While the various accumulators and flow restrictions located on opposing sides of the hydraulic device 220 may help to either mitigate and/or shift the frequency of pressure and/or flow fluctuations from other sources as noted above, these components may also introduce additional resonances within the actuator. For example, and without wishing to be bound by theory, in a hydraulic system with at least two accumulators 226 and 228 separately connected to both the extension chamber 206 and compression chamber 208 on opposing sides of the hydraulic device 220, the path of least flow resistance may be to flow fluid out from one of the accumulators and into the other accumulator through the hydraulic device itself. This fluid motion may generate a pressure and/or flow fluctuation along the first flow path 224 corresponding to a rotational resonance of the first and second accumulators 226 and 228 with the hydraulic device 220. Similar to the other resonances described herein, the resulting pressure and/or flow fluctuations may be transmitted to the piston 210 of the actuator. Accordingly, it may be desirable to include one or more components to either damp and/or shift a frequency of this resonance. For example, in one embodiment, a third accumulator 230 may be coupled to the first flow path 224. The third accumulator may have sufficient size and compliance to accommodate pressure and/or fluid flow variations transmitted along the first flow path. Accordingly, flow into and out of this third accumulator may help mitigate pressure and/or flow fluctuations along the first flow path in a frequency range including the resonance frequency between the first and second accumulators. This increased compliance (i.e., reduced stiffness) along the flow path due to the inclusion of this third accumulator may also reduce a frequency of this rotational resonance of the hydraulic device. For example, a resonance frequency of the hydraulic device, first accumulator, second accumulator, and/or third accumulator may be reduced such that it is less than about 10 Hz and/or any other appropriate frequency. Additionally, at higher frequencies (e.g., around 10 Hz and 20 Hz and wheel hop frequencies around about 12 Hz) the actuator may have a force vs. velocity relationship that is lower than it would be without the third accumulator across a range of velocities. Further, the force vs. velocity relationship of the actuator may potentially be lower than what it would be without the first flow restriction 232a, second flow restriction 232b, third flow restriction 232c, and third accumulator 230. In this way the various flow restrictions and the third accumulator may work cooperatively to provide a desired balance of top-mount/rod mass resonance shifting and damping as well as desired amount of rotational system resonance shifting and damping as well.

In some embodiments, the above noted third accumulator may be a single port accumulator attached via a side branch to the primary first flow path 224 at a location between the second accumulator 228 and the third flow restriction 232c. The inclusion of a single port accumulator may be advantageous in that it may not introduce additional flow restrictions along the first flow path 224 between the hydraulic device 220 and the associated extension volume 206 and compression volume 208 of the actuator. Additionally, while the third accumulator may add additional compliance to the flow path, the compliance of the third accumulator and a flow resistance of the associated flow restriction 232e may be appropriately selected such that the third accumulator does not substantially interact with the system above a desired cutoff frequency as detailed further below. Therefore, the flow restrictions and other accumulators used to tune the performance of certain aspects of the actuator may be substantially unaffected by this additional compliance in a desired frequency range above the cutoff frequency. Simultaneously, through the appropriate selection of the associated compliance and damping, inclusion of the single port third accumulator may also help to reduce the frequency and/or amplitude of a rotational resonance of the hydraulic device in response to the flow of fluid back and forth between the first accumulator 226 and the second accumulator 228 as detailed above.

Again, while the presence of the third accumulator 230 may help to reduce a frequency and/or amplitude of a rotational resonance of the hydraulic pump with the first and second accumulators 226 and 228, yet another resonance may be introduced to the system by its presence. Specifically, a resonance may occur between two or more accumulators located on the same portion of the first fluid flow path 224 between the hydraulic device and the corresponding compression 208 and/or extension volume 206. This resonance may be due to the two accumulators and the fluid located there between acting as a spring mass oscillator. Further, the resonance may be excited by inputs such as the pressure and/or flow ripple from the associated hydraulic device and may have a frequency between about 15 Hz and 50 Hz, though other frequencies are also possible depending on the specific device construction. During this resonance, fluid may repeatedly flow back and forth between the accumulators which may create a pressure and/or flow fluctuation along the first flow path at a resonance frequency that corresponds to the mass of the fluid between the accumulators and the compliances of the accumulators as well. For example, a resonance may occur between the second 228 and third accumulators 230 located between the hydraulic motor pump and the extension volume. During this resonance, fluid may flow between the second and third accumulators located along this branch of the first flow path located between the hydraulic device 220 and the expansion volume 206.

To help mitigate the resonance of the second 228 and third accumulators 230, in some embodiments, it may be desirable to damp out this higher frequency resonance while permitting the third accumulator to still operate in a manner to mitigate other pressure and/or flow fluctuations within the actuator as previously described. For example, a flow restriction may be included along a flow path extending between the second and third accumulators. In one specific embodiment as shown in FIG. 3, the actuator may include a fifth flow restriction 232e that is located along a flow path extending between a port of the third accumulator and the first flow path 224. In such arrangement, the fifth flow restriction may provide a flow resistance between the two accumulators without impacting the amount of flow resistance located along other portions of the first flow path 224 which may be used for tuning other performance characteristics of the actuator. As described previously above, the fifth flow restriction may have an appropriate flow resistance that, along with the compliance of the third accumulator, may create a desired cutoff frequency to the third accumulator that may be less than the resonance frequency between the two accumulators. Thus, the third accumulator may operate to mitigate pressure and/or flow fluctuations within the first flow path at frequencies less than or equal to the cutoff frequency. This cutoff frequency may be appropriately selected such that the third accumulator may help to pressure balance an actuator which may help to minimize the stiffness changes in other associated accumulators as well as permitting the use of an accumulator with a decreased stiffness.

In addition to the above, pressure and/or flow fluctuations along the flow path connecting the third accumulator with the first flow path at frequencies greater than the cutoff frequency may also be at least partially damped (i.e., the flow restriction may act as a low pass filter). Thus, the fifth flow restriction may help damp the resonance between the two adjacent accumulators. In one specific embodiment, the fifth flow restriction may correspond to a tuned shimstack or since such a construction may be tuned to provide a desired amount of damping in a particular frequency range. In some embodiments, the shimstack may be used in combination with a small, fixed diameter orifice. However, embodiments in which the flow restriction corresponds to a shimstack, a fixed orifice, a restriction valve, a combination of the forgoing, and/or any other appropriate structure capable of providing the desired flow resistance and corresponding frequency cutoff are also contemplated as the disclosure is not so limited.

As noted above, in some embodiments, it may be desirable to provide a cutoff frequency for fluid flows into and/or out of the third accumulator to minimize any excitations of the resonance between the second accumulator 228 and the third accumulator 230. Accordingly, a compliance of the second accumulator 228, a compliance of the third accumulator 230, and a flow resistance of the fifth flow restriction 232e located between the third accumulator 230 and the first flow path may be selected to provide a cutoff frequency that is less than the resonance frequency between the accumulators. Therefore, while any appropriate cutoff frequency may be used, in one embodiment, the cutoff frequency may be greater than or equal to 10 Hz, 20 Hz, 30 Hz, 40 Hz, and/or any other appropriate frequency. The cutoff frequency may also be less than or equal to 100 Hz, 90 Hz, 80 Hz, 70 Hz, 60 Hz, 50 Hz, and/or any other appropriate frequency. Combinations of the above ranges are contemplated including a cutoff frequency that is between or equal to 10 Hz and 100 Hz, 30 Hz and 100 Hz, and/or any other appropriate combination. While specific frequency ranges for the cutoff frequency are given above, it should be understood that other frequencies both greater and less than those noted above are also contemplated as the current disclosure is not so limited.

The single port third accumulator 230 and the associated fifth flow restriction 232e have been described above and depicted in the figure as being fluidly coupled to the first flow path 224 at a location between the third flow restriction 232c and the second accumulator 228 along the first flow path 224. However, the current disclosure is not limited to only including the third accumulator at this particular location. For example, embodiments in which the third accumulator is connected at different locations along the first flow path between the extension volume and the compression volume are also contemplated. In one such embodiment, the third accumulator and associated fifth flow restriction may be fluidly coupled to the first flow path at a location between the extension volume 206 and the third flow restriction 232c. Positioning the third accumulator in such a fashion may offer additional damping of the resonance between the third accumulator and the second accumulator due to the inclusion of the additional flow resistance between the accumulators from the third flow restriction. However, the third accumulator may be subjected to different hydraulic pressure fluctuation frequencies at this location as well. Accordingly, a flow resistance of the fifth flow restriction and a compliance of the third accumulator may be tuned as previously described to have a different appropriate cutoff frequency than in the previous embodiment. Additionally, this the accumulator may be included at other locations along the first flow path as well as the disclosure is not limited in this fashion.

In addition to helping to shift the frequency of, and/or at least partially damp the various resonances described above, in some embodiments, the various flow restrictions and accumulators may also be used to help reduce the effect of pump ripple, i.e., both pressure and/or flow ripple, on a piston 210 during operation. Again, referencing the embodiment depicted in FIG. 3, the actuator 202 may include a first flow restriction 232a disposed between the hydraulic device and the first flow through accumulator 226 which is fluidly coupled to the compression volume 208 along a portion of the first flow path 224 connecting the compression volume to the hydraulic device. Similarly, a fourth flow restriction 232d may be disposed between the hydraulic device and the second flow through accumulator 228 which may be fluidly coupled to the extension volume 206 along a portion of the first flow path connecting the extension volume to the hydraulic device. The flow resistances of the first and fourth flow restrictions may be selected in combination with the associated compliances of the accumulators to have a cutoff frequency as previously described that is less than a minimum applicable pump ripple frequency of the hydraulic device that is of interest for either control, vibration, and/or noise purposes.

Accordingly, pressure and/or flow fluctuations that are transmitted to the piston due to pump ripple may be at least partially damped due to the presence of the first and fourth flow restrictions. Further, due to the presence of the first and second accumulators, the maximum pressure downstream of each accumulator may be dominated by the compliance of the accumulator itself (disregarding static flow pressure losses). Of course, it should be understood that this does not take into account pressure variations due to other hydraulic resonances, accumulator piston friction, and/or the mechanical resonances of the accumulators themselves. In either case, the high frequency ripple generated at the pump and transmitted to the piston may be at least partially mitigated in such an arrangement. Further, due to the inclusion of multiple separate flow restrictions and accumulators, the pump ripple may be at least partially mitigated while also shifting and/or at least partially mitigating resonances and other forms of pressure and/or flow fluctuations within the overall system at the same time.

In view of the above embodiment regarding mitigating pump ripple, the compliance of the first and second flow through accumulators 226 and 228 as well as the flow resistances of the associated first and fourth flow restrictions 232a and 232d may be selected to provide any desired cutoff frequency for reducing the pump ripple transmitted to an associated piston 210. However, in one embodiment, the cutoff frequency may be greater than or equal to a maximum operating frequency of the actuator and/or a frequency that is equal to or greater than a wheel control frequency. For example, the wheels of a vehicle may be controlled at frequencies on the order of about 15 Hz to 30 Hz. Correspondingly, the accumulators and associated flow resistances may be selected to provide a cutoff frequency that is greater than or equal to 15 Hz, 20 Hz, 30 Hz, 40 Hz, and/or any other appropriate frequency. The cutoff frequency may also be less than or equal to 100 Hz, 50 Hz, 40 Hz, 30 Hz, and/or any other appropriate frequency. Combinations of the above frequency ranges are contemplated including, for example, a cutoff frequency that is between or equal to 20 Hz and 30 Hz, 20 Hz and 40 Hz, 20 Hz and 100 Hz, and/or any other appropriate range of frequencies including frequencies both larger and smaller than those noted above as the disclosure is not so limited.

In the above noted embodiments, the various accumulators may have any appropriate combination of sizing and compliance as the disclosure is not limited in this way. However, in one embodiment, the second accumulator 228 and the third accumulator 230, i.e., the flow through accumulator and single port accumulator located along the portion of flow path 224 between the hydraulic device 220 and the extension volume, may be sized to reduce the stiffness of the hydraulic circuit which may also decrease the amplitude of pressure and/or flow ripple resulting from the pump ripple generated by the hydraulic device.

Specifically, the third accumulator may have a volume, (e.g., gas volume), that is greater than or equal to a volume of the second accumulator. For example, when the third accumulator and the second accumulator have approximately equal sizes, about 75% of the maximum possible impedance reduction is provided. If the third accumulator is twice the volume of the second accumulator, about 75% of the maximum possible impedance reduction is provided. If the third accumulator is four times the size of the second accumulator 95% of the maximum possible impedance reduction is provided. Therefore, while the third accumulator may be made infinitely large to provide a maximum possible impedance reduction, due to size restrictions, in some embodiments, the third accumulator may have a compliance that is between or equal to 1 to 6 times a compliance of the second accumulator, 3 to 5 times a compliance of the second accumulator, 3 to 4 times a compliance of the second accumulator, and/or any other appropriate compliance ratio including ratios both larger and smaller than those noted above.

In some embodiments, to help reduce a maximum absolute pressure developed within a hydraulic actuator, it may be desirable to balance a ratio of the accumulator volumes on either side of a hydraulic device and/or that are in fluid communication with the compression and extension volumes of the actuator. Accordingly, a ratio of a volume of a first accumulator located on one side of a hydraulic device and a second accumulator located on an opposing side of the hydraulic device, e.g., the first and second accumulators 226 and 228, may have a volume-to-volume ratio that is between or equal to 3:1 and 1:3, 2:1 and 1:2, and/or any other appropriate ratio. This may include, for example, a ratio of 1:1 where the accumulator volumes on either side of the hydraulic device are approximately equal.

In view of the above, it should be understood that the various flow restrictions, accumulators, and other hydraulic components may be designed in a synergistic manner to provide a desired combination of performance characteristics with reduced amounts of pressure and/or flow fluctuations. Further, by including multiple described components that interact with each other in the various ways described above, it is possible to tune the compliances and resistances of the system to balance these competing desires for actuator operation.

In addition to the occurrence of pressure and/or flow fluctuations within an actuator, pressure differentials within an actuator may also be controlled in various ways to provide desired actuator operation. Pressure differentials may be generated in a hydraulic actuator in a number of different ways. For instance, a pressure differential may be generated in an actuator due to operation of a hydraulic device (e.g., hydraulic motor or pump) and/or from flow induced pressure losses in the system due to motion of the piston actuator. A maximum pressure differential in a hydraulic actuator may be chosen to provide the desired force vs. velocity characteristics for operation of a particular actuator. Further, pressure differentials above this maximum threshold may be undesirable for a number of reasons. For example, in some instances, an excessive pressure differential between the compression and extension volumes of an actuator may correspond to one of the internal volumes having an excessively low pressure which may result in cavitation. This cavitation may lead to component damage as well as pressure and/or flow fluctuations within the system. Excessive pressure differentials may also correspond to excessive fluid flow rates which may exceed a desired maximum operating speed of an associated hydraulic device of the actuator.

In view of the above, in some embodiments, it may be desirable to include one or more pressure relief and/or pressure blow-off-valves within a hydraulic actuator to allow pressure differential above a certain threshold to open the valve and permit fluid to flow between the compression and extension volumes of an actuator. This flow of fluid between the compression and extension volumes may relieve, or at least prevent an increase of, the pressure differential across a piston of the actuator. To open the pressure relief and/or pressure blow-off valve, in some embodiments, it may be desirable to include one or more flow restrictions along a flow path extending between the extension and compression volumes and through an associated hydraulic device to create a sufficient pressure differential across one or more portions of the hydraulic actuator that is sufficient to open the associated blow-off-valve at one or more operating points of the actuator. For example, a flow restriction that adds flow resistance to a flow path will create additional pressure drop with flow. Therefore, increased flow resistance along the flow path including the hydraulic device will result in increased pressure differentials at lower flow rates and decreased flow resistance will result in decreased pressure differentials at higher flow rates. Accordingly, by appropriately configuring the flow resistances of the one or more flow restrictions located along the noted flow path, it is possible to control a threshold flow rate above which a sufficiently large pressure differential is generated to open the one or more blow-off valves.

The pressure differential used to open the above noted one or more blow-off valves, and the threshold flow rate at which this pressure differential is generated, may be appropriately selected to address several design considerations at once. For example, operation of the blow off valves may be configured reduce the occurrence of, and/or substantially prevent, cavitation and/or pressure spikes within the hydraulic device. Without wishing to be bound by theory, the one or more blow off valves may accomplish this by reducing the flow of fluid between accumulators located on either side of an associated hydraulic device during these operating conditions. However, as described further below, the hydraulic device may be appropriately configured to balance these considerations along with others including the force versus velocity command authority of the hydraulic actuator since opening of a blow-off valve at a particular flow rate may limit the force versus velocity capabilities of the actuator.

While the flow restrictions included in an actuator may be the primary components limiting the flow rate of fluid through a hydraulic device of the actuator, in some embodiments, a threshold flow rate that generates a sufficient pressure for opening the one or more blow-offs valves of an actuator may be less than or equal to a desired maximum rotational speed of the hydraulic device. In such an embodiment, opening the one or more blow-off valves may divert at least a portion of the fluid flowing between the extension and compression volumes of the actuator around the hydraulic device through a separate flow path. By diverting flow through a pressure blow-off-valve at flow rates above this threshold flow rate, additional flow to the hydraulic device with increasing actuator velocity may be reduced which may help to prevent, or at least partially mitigate, over speed events of the hydraulic device as detailed further below.

One embodiment in which fluid may bypass a hydraulic device of an actuator is depicted in FIG. 3. In the depicted embodiment, an actuator 202 may include at least one blow-off valve 210a which may be disposed in the piston 210. The blow off valve may have an opening pressure differential that is appropriate to prevent cavitation within the extension 206 and/or compression volumes 208 of the depicted actuator 202. For example, it may be desirable to appropriately tune the parameters of the various hydraulic components in the actuator to prevent cavitation within the extension volume during a compression and/or extension stroke of the actuator. In one such embodiment, the second flow restriction 232b, located between the first accumulator 226 and an inlet to the compression volume 208, may provide sufficient flow resistance during the compression stroke to prevent cavitation within the extension volume. Without wishing to be bound by theory, the pressure within the extension volume may be a function of the rate of compression of the actuator versus the flow of fluid provided by the second and third accumulators 228 and 230 through the corresponding third flow restriction 232c. Thus, the compliances of the second and third accumulators as well as the flow resistances of the corresponding flow restrictions may be selected to appropriately balance the flow of fluid into the extension volume as well as the flow of fluid out of the compression volume to maintain a pressure in the extension volume that is greater than a saturated vapor pressure of the hydraulic fluid within the system. These components may also be constructed such that if a flow rate between the extension and compression volumes exceeds a threshold flow rate, a corresponding pressure differential may be generated across the piston that is sufficient to open the at least one blow-off valve to permit fluid to flow between the compression and extension volumes through the blow-off valve. For example, any of the first, second, third, and/or fourth flow restrictions 232a-232d may be appropriately sized such that a fluid flow greater than a threshold flow rate may create a pressure differential between the extension compression volume sufficient to open the blow-off valve. Again, this flow of fluid between the compression and extension volumes may reduce the pressure differential across the piston to avoid cavitation within the actuator.

As also noted above, while the flow restrictions may be a key mechanism for limiting flow through a hydraulic device of an actuator, in some embodiments, it may be desirable to operate the one or more blow-off valves of an actuator to provide an additional method of limiting and/or preventing over speeding of a hydraulic device of an actuator. Specifically, by controlling the pressure differential across a piston of an actuator versus fluid flow between an expansion and compression volume of the actuator, it may be possible to provide additional over speed protection using a blow-off valve. Turning again to FIG. 3, such an embodiment is described in further detail. In the depicted embodiment, the actuator 202 again includes a piston 210 disposed between an extension volume 206 and a compression volume 208. As described above, the extension volume is fluidly coupled to the compression volume by a first flow path 224 that passes through a corresponding hydraulic device 220. The actuator may include at least one flow restriction located between the hydraulic device and each of the compression and extension volumes. For example, as shown in the figure, a second flow restriction 232b is disposed between the hydraulic device and the compression volume and a third flow restriction 232c is disposed between the hydraulic motor pump and the extension volume. At least one blow-off valve 210a may again be located in the piston. Depending on the particular embodiment, the actuator may include a blow-off valve that provides selective fluid communication from the extension volume to the compression volume, a blow-off valve that provides selective fluid communication from the compression volume to the extension volume, and/or two blow-off valves that permit selective fluid flow in both directions. In either case, a blow-off valve may provide selective flow in a particular direction when a pressure drop across the piston in that direction is greater than a threshold pressure differential of the valve. When the blow-off valve is opened, at least a portion of the hydraulic fluid passing between the extension and the compression volumes may bypass the hydraulic device by flowing across the piston instead which may help to at least partially mitigate, and in some instances prevent, over-speeding of the hydraulic device.

The Inventors have recognized that the operating speed of a hydraulic device may be related to the flow rate of hydraulic fluid through a flow path associated with the hydraulic device. Accordingly, by controlling the pressure differential between the extension 206 and compression volumes 208 of an actuator 202 versus flow rate, the Inventors have recognized that is possible to control the flow rate at which a sufficient pressure differential to open a blow-off valve is generated. Specifically, due to their positions along the first flow path 224 between the hydraulic device 220, the associated accumulator 226 and 228, and the corresponding extension 206 or compression volumes 208, the second flow restriction 232b and and/or the third flow restriction 232c may be used to control the pressure differential generated between the extension and compression volumes during operation. Specifically, a flow resistance of the second and/or third flow restrictions may be selected to generate a threshold pressure differential at flow rates greater than a threshold flow rate to open the one or more blow-off valves 210a to limit the operating speed of the hydraulic device during either a compression and/or an extension stroke. For example, during an extension stroke, the second flow restriction creates a pressure drop between the associated first accumulator 226 and the compression volume 208 that is directly related to the rate of fluid flow from the extension volume to the compression volume through the first flow path 224. This may result in a pressure differential across the piston 210 that opens the blow-off valve 210a when the fluid flow rate exceeds a threshold flow rate permitting at least a portion of the fluid flow to flow from the extension volume to the compression volume through the blow-off valve. A similar operation may occur during a compression stroke where the third flow restriction, the flow rate, and other components may interact to create a pressure differential at a threshold flow rate to open the associated blow-off valve. It should be understood that the various flow restrictions and a threshold pressure differential of a blow-off valve may be appropriately selected to help prevent cavitation, pressure spikes, and/or to provide over speed protection depending on the particular design of the associated hydraulic/pump. Accordingly, the current disclosure is not limited to any particular combination of design parameters.

In view of the above, the various flow restrictions, compliances, opening pressure differentials, and other appropriate system components may be balanced within an actuator to help mitigate cavitation and/or over speed events of the actuator.

In the above embodiments, any pressure differential across the piston may lead to opening of a blow-off valve depending on the particular actuator construction. However, regardless of the hydraulic device speed and/or flow rate at which this happens, the actuator is capable of delivering the same force regardless of the speed at which the blow-off valve opens. This is due to the force generation of an actuator being related to the pressure, not speed, of operation. Specifically, since the blow-off valve opens at a particular pressure differential, the pressure differential across the piston is the same regardless of speed once the valve is open. Additionally, since the actuator force is related to the pressure differential and corresponding area to which this pressure differential is applied on the piston, the actuator force may be substantially constant regardless of the speed of actuation when the blow-off valve is open. Accordingly, opening a blow-off valve may limit the force an actuator is capable of applying to a maximum force for flow rates greater than the threshold flow rate at which the blow-off valve opens.

In view of the above, in some embodiments, it may be desirable to have a blow-off valve of an actuator open at as high a fluid flow rate as possible to permit the application of larger forces at higher fluid flow rates, i.e., faster actuator operating speeds. For example, as discussed above, lower flow resistances lead to the blow-off valve opening at higher flow rates which may be associated with larger operating pressures at higher operating speeds and corresponding flow rates. In comparison, larger flow resistances lead to the blow-off valves opening at lower pressure differentials, which may result in reduced forces being generated at higher speeds due to the blow-off valves opening at a lower flow rate which may limit the ability of the actuator to generate larger pressure differentials for faster flow rates and actuator operation speeds. Therefore, in some embodiments, it may be desirable to minimize the flow resistance of the one or more flow restrictions used to generate the desired pressure differential to open the one or more blow-off valves while still providing the desired resonance shifting, pressure and/or flow fluctuation damping, cavitation prevention, and/or over speed protection previously discussed. In some embodiments, the blow off valves may be digressive. However, embodiments in which the blow off valves are exhibit progressive and/or linear behavior are also contemplated as the disclosure is not so limited.

In the above embodiment, if a flow restriction used to control the opening of a blow-off valve is located upstream of an accumulator relative to the piston 210, such as is the case for the second and thirds flow restrictions 232b and 232c, the flow originating from movement of the actuator piston may largely enter the associated accumulators rather than flowing through the hydraulic device 220. Therefore, in embodiments in which the second and/or third flow restrictions are used to control the opening of an associated blow-off valve 210a, the pressure differential will be primarily dictated by the compliance of the first 226 and/or second 230 accumulators as well as the speed at which the piston is driven. Accordingly, the compliance of the first and second accumulators 226 and 228 may be balanced with the second and/or third flow restrictions to generate the desired pressure differential to open the blow-off valve. In contrast, in some embodiments, it may be desirable to place a flow restriction downstream of the accumulator relative to the piston such that some flow can enter the accumulator relatively unimpeded while some fluid flows through the associated flow restriction and through the hydraulic device. For example, the first and fourth flow restrictions 232a and/or 232d may be used to generate the desired pressure differential at a threshold flow rate. In this way the total pressure differential generated for a given piston velocity may be slightly less than if the flow restriction used to generate the pressure differential was located upstream of the accumulator relative to the piston and the characteristics for force vs. velocity may be more desirable. Of course, it should be understood that combinations of these two strategies may be used in which any one or more of the first, second, third, and/or fourth flow restrictions may be used in combination with the associated compliances of the first, second, and/or third accumulators to provide the desired pressure differential versus flow rate characteristics to open the blow-off valve at the desired threshold flow rate.

In reference to, a cross section of an embodiment of an actuator similar to that schematically shown in FIG. 3, not depicted, an actuator 202 includes a housing 204 and a piston 210 slidably disposed therein to define the extension volume 206 and compression volume 208. The actuator again includes a hydraulic device 220 that is fluidly coupled to the compression volume 208 through a first flow restriction 232a which is coupled to a first port of a first flow through accumulator 226 and a second flow restriction 232b corresponding to an appropriately sized annular gap, which is described further below, which is fluidly coupled to the compression volume. The actuator also includes another portion of the flow path that extends between the extension compression volumes through the hydraulic device that is coupled to the extension volume. This portion of the flow path passes from a port of the extension volume to a third flow restriction 232c, which is in the form of an annular gap located between the inner pressurized tube 204a of the depicted twin tube housing and a surrounding cylindrical component disposed along a portion of the length of the inner tube. The third flow restriction is fluidly coupled to a second flow through accumulator 228 and a single port accumulator 230. The second flow through accumulator is connected to a second port of the hydraulic device through a fourth flow restriction 232d.

In the above embodiment, the gaps used to form the noted flow restrictions may have any appropriate size and/or shape (annular or not annular) to function as a flow restriction and achieve the desired amount of flow resistance and inertance. Additionally, these gaps may be constructed between any appropriate components within the actuator. Further, while a particular construction has been depicted in the figures, it should be understood that any appropriate arrangement of the noted components, as well as the use of different types of components to provide the desired functionality, may be used as the disclosure is not limited to this specific actuator construction.

To provide the above-noted desired flow characteristics, in one specific embodiment, the annular gap may have a radial gap (i.e., a radial distance between the inner and outer tubes) that is between or equal to 0.5 mm and 1.5 mm, 0.5 mm to 0.9 mm, 0.6 mm to 0.8 mm, and/or any other appropriate distance. The corresponding inner diameter of the annular gap may be between or equal to 30 mm and 50 mm, 35 mm and 45 mm, 38 mm and 40 mm, and/or any other appropriate distance. A length of this annular gap may be between or equal to about 100 mm and 150 mm and/or any other appropriate length. This range of parameters may provide a flow resistance that is appropriate to damp frequencies between or equal to about 75 Hz and 150 Hz. In one specific embodiment, the annular gap may have combined dimensions of a radial gap of about 0.7 mm, an inner diameter of the annular gap of about 39 mm, and a length of the annular gap of about 150 mm. This combination of dimensions is more narrow than typical annular gaps in other twin tube constructions specifically because the Inventors have recognized that such a construction offers the desired flow resistance in a compact construction. The annular gap is also narrower that typical twin tube applications because twin tube systems typically do not include large energy sources capable of providing excitations in the noted frequency ranges due to these systems not including a pump or other hydraulic device. This is of particular benefit in applications such as an actuator used in an active suspension system of a vehicle where the maximum diameter and length of an actuator may be constrained by the dimensions of the associated wheel well of the vehicle and other packaging considerations. For example, in comparison, a linear tube with a 12 mm diameter would need to be approximately 12 m long to provide a similar flow resistance and desired amount of damping which would not be usable in such an application. This helps to illustrate the compact nature of such an embodiment.

It should be noted that, in some embodiments, the pressure drop associated with flow through the above-described annular gap goes as the cube of the radial gap. Commercially available dampers are specifically designed to avoid this effect and have large gaps which may be on the order of about 3 mm to 5 mm for similarly sized actuators to avoid generating these non-linear fluid losses. Accordingly, the radial gaps described above have drastically different operating characteristics and are constructed to specifically provide high frequency damping, inertance, and flow resistance characteristics that typical actuators would not include.

The Inventors have recognized that the damping and flow resistance associated with flow through an annular gap may change with temperature due to changes in viscosity with temperature. Specifically, increased viscosities at reduced temperatures may lead to increased flow resistance and damping. Correspondingly, decreased viscosities at elevated temperatures may lead to decreased flow resistance and damping. Accordingly, in some embodiments, the inner and outer tubes forming the desired annular gap may be constructed of materials with different thermal expansion coefficients to adjust the annular gap with temperature. For example, the thermal expansion coefficients of the inner and outer tubes, as well as the relative sizing of the tubes may be selected such that the annular gap decreases with increasing temperature. The rate at which the annular gap decreases with increasing temperature may be selected to reduce a change in the flow resistance and damping characteristics of the annular gap with temperature.

While an annular gap has been described above, the current disclosure is not limited to only this type of construction to provide a desired flow resistance. Additional constructions that may be used to provide a desired flow resistance and or damping within the system are also shown in FIGS. 4A-4E. Specifically, these descriptions show several embodiments of restrictions that may be implemented in an actuator to provide a desired flow resistance.

Figure 4A:
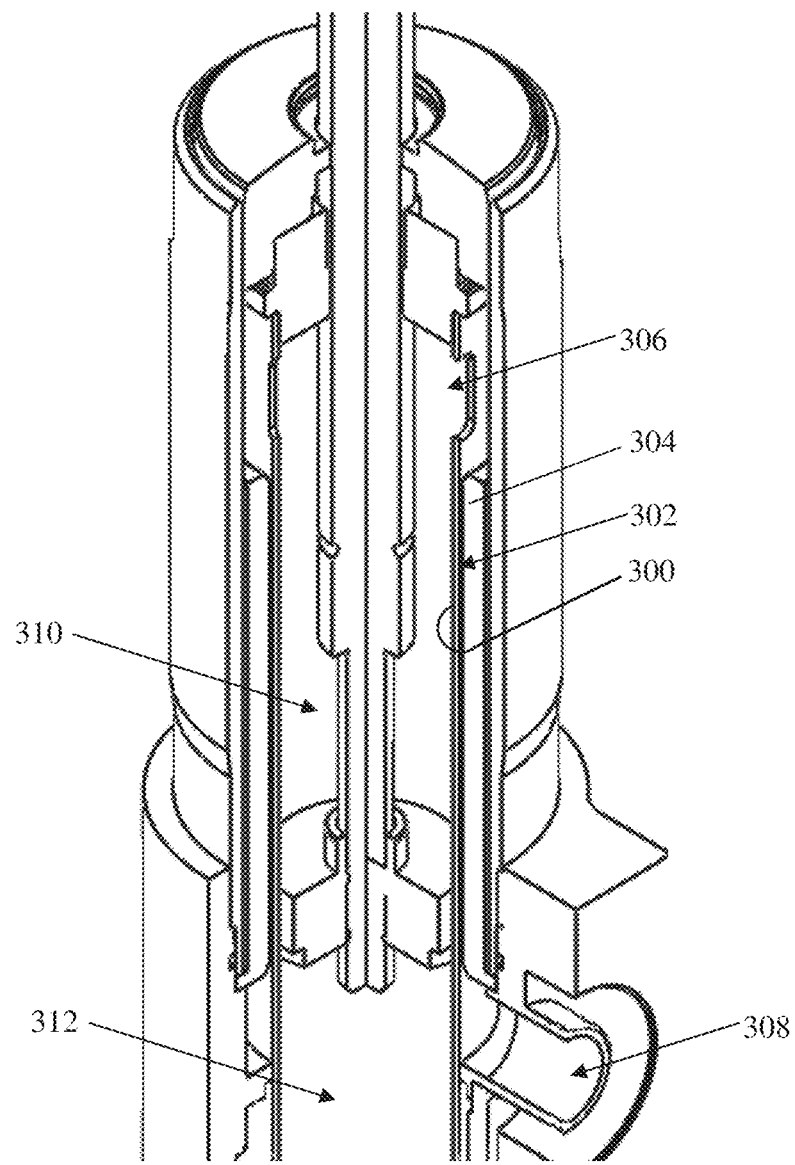
FIG. 4A is a schematic depiction of one embodiment of a flow restriction for use in an actuator.
Figure 4B:
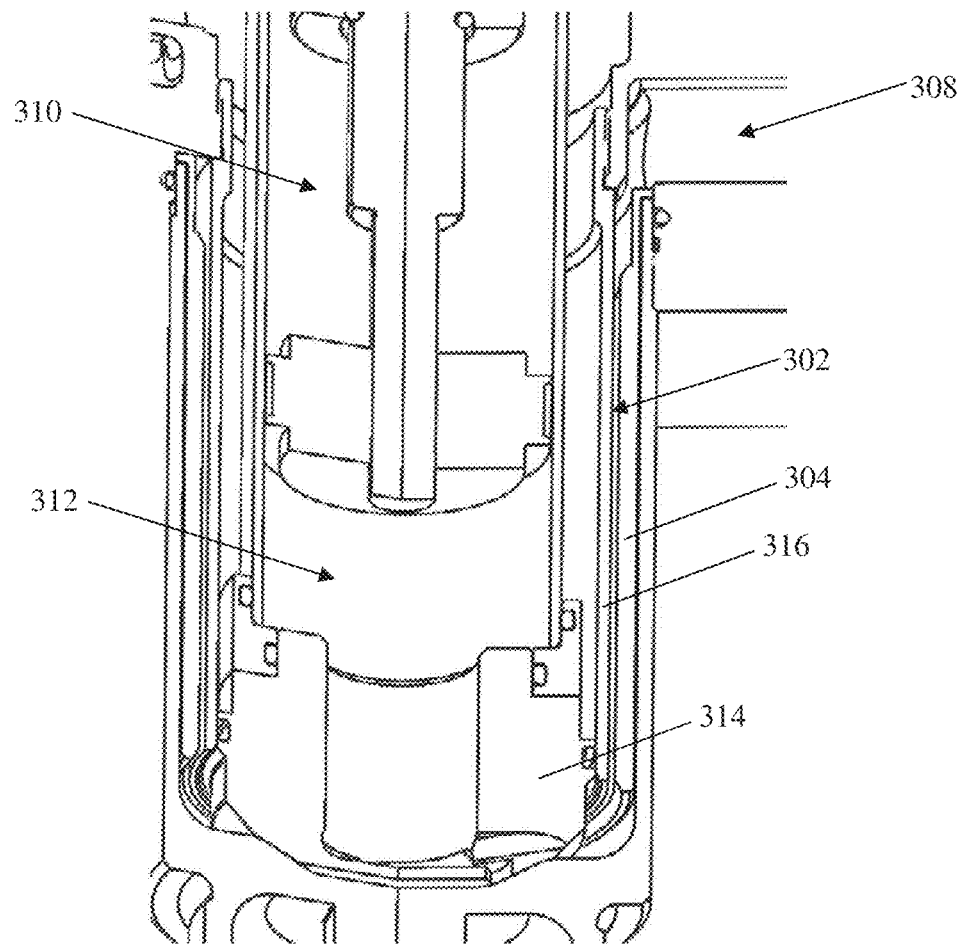
FIG. 4B is a schematic depiction of one embodiment of a flow restriction for use in an actuator.
Figure 4C:
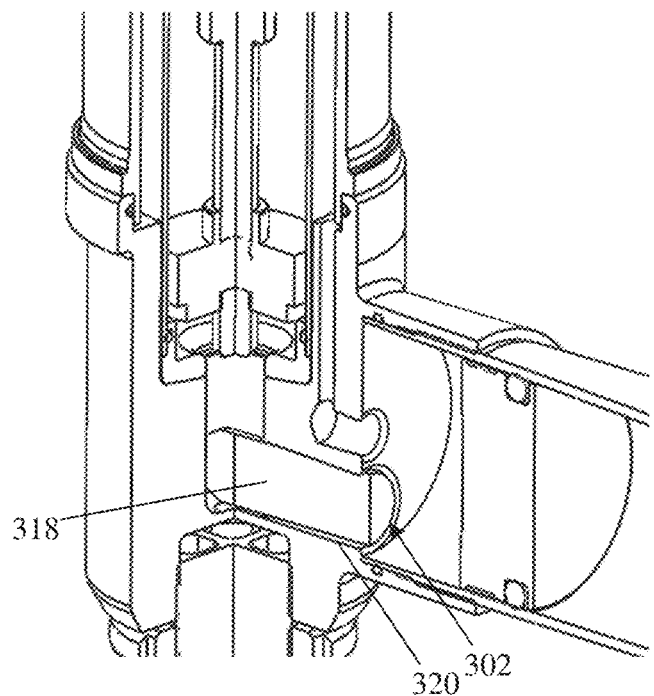
FIG. 4C is a schematic depiction of one embodiment of a flow restriction for use in an actuator.

FIG. 4A depicts an embodiment in which a flow restriction corresponds to an annular gap 302 formed between an outer diameter of a pressure tube 300 and the inner diameter of a separate component such as a sleeve 304 at least partially surrounding the pressure tube along at least a portion of a length of the pressure tube. The annular gap may provide fluid communication between a first port 306 fluidly coupled to an internal volume of the actuator located within the pressure tube, such as the extension volume 310, and a second port 308 fluidly coupled to a flow path fluidly coupled to an associated port of a hydraulic device, not depicted. Of course, while the annular gap has been shown as being connected to the extension volume and located between the pressure tube and a separate sleeve in the above embodiment, the disclosure is not limited to only this construction. For example, a flow restriction in the form of an annular gap may be in fluid communication with any appropriate portion of a hydraulic system including, for example, a compression volume of the actuator. Additionally, the annular gap 302 may be formed between any appropriate components arranged to form an annular gap located along a flow path of the hydraulic actuator, for example, FIG. 4B shows an annular gap 302 in fluid communication with an accumulator 314 associated with a compression volume 312 of the actuator. The annular gap is formed between an outer tube 316 of a twin tube housing and a sleeve 304 similar to that noted above surrounding the bottom portion of the twin tube housing. The actuator also includes a port 308 fluidly coupled to a hydraulic device, not depicted, which is in fluid communication with the accumulator through the annular gap. FIG. 5C depicts yet another embodiment in which the annular gap 302 is formed between a plug insert 318 disposed within a surrounding flow path 320 creating an annular flow path around the plug insert.

Figure 4D:
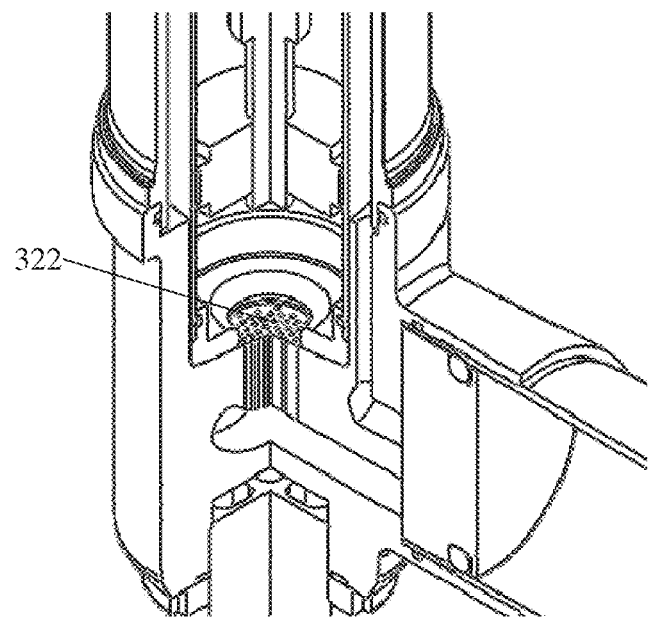
FIG. 4D is a schematic depiction of one embodiment of a flow restriction for use in an actuator.
Figure 4E:
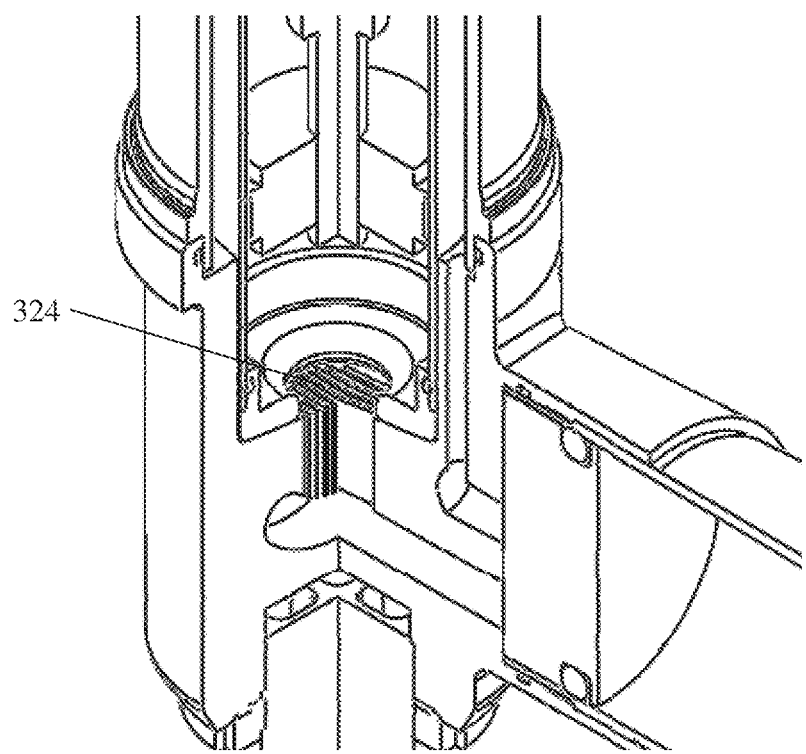
FIG. 4E is a schematic depiction of one embodiment of a flow restriction for use in an actuator.

While the above embodiments are directed to the use of annular gaps to form a desired flow restriction, other embodiments for flow restriction constructions with increased surface areas are also contemplated. For example, FIG. 4D depicts an embodiment in which a flow restriction is formed by an array of holes 322 connecting two portions of a flow path to each other through the array of holes. Each of the holes may have a relatively small diameter to length ratio (i.e., the holes may have lengths that are at least longer than their diameters). Such a construction exhibits an increased surface area of the walls relative to the cross-sectional area of the flow path which may increase the shear area for fluid and thus increase the linear damping contribution of the pressure drop. FIG. 4E depicts another embodiment of a flow restriction in which the restriction is formed by an array of slots 324 connecting two portions of a flow path to each other through the array of slots. The slots may have spacings that are thinner than the slots are long such that a large wall surface area may be formed relative to the cross-sectional area of the structure. While not depicted in the figures, another method for forming a flow restriction may including forming one or more helical flow paths connecting two portions of a flow path which may increase the effective length of restrictions relative to the overall package size of an associated component.

It should be understood that the above noted flow restriction constructions may be used to form any of the flow restrictions described here in. Additionally, these particulars constructions may provide a more compact device package for a given flow resistance which may be useful in applications such as vehicle suspension systems where packaging dimensions may be limited. However, embodiments in which different types of flow restrictions are used are also contemplated as the current disclosure is not limited to any particular type of flow restriction construction.

As noted previously, the inertia of a hydraulic device may limit the ability of an actuator to respond to relatively small high frequency disturbances. For example, when a vehicle is operating at lower vehicle velocities the inputs to the vehicle from the road may be small enough such that the inertia of an actuator may prevent it from responding quickly enough to mitigate these smaller distances. In other instances, such as when a vehicle is traveling at higher speeds, a majority of actuator force within an active suspension system may be used to control large displacements of a vehicle body that may be encountered when operating at these higher speeds. Thus, less actuator force may be available to mitigate higher frequency lower magnitude disturbances applied to the vehicle. Additionally, these higher frequency lower magnitude disturbances may also be difficult to mitigate even at these higher vehicle velocities due to the same inertia concerns noted above related to operation of the actuator. In either case, this may result in increased transmission of road inputs to the chassis of a vehicle at these velocities which may then be perceived by an occupant.

In view of the above, the inventors recognize the benefits with selectively permitting fluid to bypass a hydraulic device 220 of an actuator as shown in FIG. 3. This may reduce an impedance of the system which may correspondingly reduce the forces applied by the actuator to an associated structure in response to the above noted high frequency inputs. Accordingly, in some embodiments, and as previously described, an active suspension system of a vehicle may operate in a second mode of operation when the vehicle velocity is below a threshold velocity, or in response to any other appropriate vehicle operating condition where high frequency low magnitude events may occur, to reduce the effect of impedance on system performance. Specifically, in one embodiment, and as shown in FIG. 3, an active suspension system 200 may include an actuator 202 with the previously described hydraulic components including the first flow path 224 that extends between an extension volume 206 and a compression volume 208 through a corresponding hydraulic device 220. The actuator may also include a bypass flow path 234 that is either fluidly coupled to portions of the first flow path 224, and/or directly with the extension volume and the compression volume, to bypass the hydraulic device. Accordingly, fluid flowing along this second flow path may pass between the extension volume and the compression volume without passing through the hydraulic device.

The second flow path may include a valve 236 that may be selectively positioned in at least an open and closed position to selectively permit flow through the second flow path. In some embodiments, the valve may be an electronically controlled and actuated valve such that a valve position may be controlled by an associated controller 240. For instance, the valve may be an electro-hydraulic valve that may be selectively opened, closed, and/or partially opened. The valve may also be proportional, on/off, bi-directional, uni-directional, and/or any other appropriate type of valve. In one embodiment, the controller may receive information related to the vehicle's velocity from any appropriate information source. For example, when the vehicle is operating at a vehicle velocity greater than a threshold vehicle velocity, the controller may maintain the valve in a closed position preventing flow through the bypass flow path. When the velocity of the vehicle is less than or equal to a threshold vehicle velocity, the controller may open the valve permitting flow through the second flow path. In such a mode of operation, at least a portion of the fluid flowing between the extension volume and the compression volume may pass through the second flow path. Of course, other operating modes in which it may be desirable to lower the overall system impedance by at least partially opening the valve to bypass the hydraulic device, including, for example, when applied pressure differentials are less than a threshold pressure differential, are also contemplated as previously described above. However, regardless of the operating condition the controller bases its decision to open the valves, once opened, fluid may flow between the extension volume and the compression volume without needing to overcome the inertia of the hydraulic device which may lead to a softer perceived ride with lower magnitude disturbances being transmitted to the chassis 216 of the vehicle.

As noted previously, a number of different resonances as well as pressure and/or flow fluctuation sources may be present within an actuator. Further, as previously noted a number of the different flow restrictions and accumulators within an actuator may be tuned to help shift the frequency of and/or damp pressure and/or flow fluctuations from these various sources. However, selectively permitting flow through the bypass flow path 234 may also permit pressure and/or flow fluctuations to propagate through the bypass flow path itself. Accordingly, to help reduce the possibility of flow through the bypass flow path causing additional unwanted pressure and/or flow fluctuation changes in the system, it may be desirable, in some embodiments, to include a flow restriction that is selected in combination with the various compliances and impedances of the actuator to reduce the propagation of pressure and/or flow fluctuations through the bypass flow path within at least certain frequency ranges. Therefore, in some embodiments, the second flow path 234 may include at least one flow restriction 238 that is constructed in combination with the associated compliances and impedances of the actuator to provide a desired cutoff frequency for the bypass flow path. In one such embodiment, the cutoff frequency may be selected to at least partially damp higher frequency disturbances that are greater than an expected frequency of road disturbances at these lower velocities which may have frequencies in the range of 10 Hz to 30 Hz, 12 Hz to 20 Hz, and/or any other appropriate frequency range. Thus, the second flow path may permit fluid to flow between the extension and compression volumes 206 and 208 of the actuator in response to inputs from the road while excluding higher frequency inputs which may be associated with various other types of resonances and other types of pressure and/or flow fluctuations. However, it should be understood that other frequency cutoffs may also be used as the disclosure is not limited to any particular frequency range.

While a second flow path that bypasses a hydraulic device has been described above relative to a vehicle operating at velocities less than a threshold vehicle velocity, embodiments in which the second flow path and associated valve may be operated to selectively bypass at least a portion of fluid around a hydraulic device in other operating modes are also contemplated. For example, as noted previously, small magnitude, high-frequency vibrations may also occur at higher vehicle velocities when driving along a straight path as well. Accordingly, the described second flow path and associated valve may be operated to mitigate small magnitude disturbances with frequencies where an inertia of the actuator may restrict the ability of the actuator to actively mitigate the disturbances in other operating modes as well.

Similar to the inclusion of a bypass flow path that bypasses a hydraulic device, in some embodiments, it may be desirable to include a small, fixed diameter orifice in a piston of an actuator to also help reduce vibrations experienced in a vehicle when inertia and/or force availability of an actuator may limit an ability of the actuator to respond to actively mitigate one or more inputs. For example, as previously discussed, low amplitude events may be difficult for an actuator to respond to due to inertia consideration. Therefore, this type of orifice in the piston may also help mitigate inputs to an actuator that the rest of the hydraulic system is unable to mitigate either passively and/or actively. FIG. 3 depicts an embodiment of an actuator 202 implementing such a construction. In the depicted embodiment, the actuator may include a piston 210 disposed between an extension volume 206 and compression volume 208. The piston may also include one or more fixed diameter orifices 210b that extend from one side of the piston to a second opposing side of the piston such that fluid may flow between the extension volume and the compression volume through the one or more orifices. This flow between the extension volume and compression volume bypasses the hydraulic device, which may again help to reduce the magnitude of road disturbances transmitted to a chassis 216 of a vehicle during various operating conditions where the actuator is unable to actively or passively mitigate the applied disturbances. However, the inclusion of one or more orifices in a piston comes at the expense of increased hydraulic device power being used to generate the same forces as compared to a similar actuator that does not include orifices due to the increased leakage of hydraulic fluid across the piston. Accordingly, the flow resistance, e.g., orifice size and length, may be selected to balance both how harsh a ride may be acceptable at lower vehicle velocities versus the desired hydraulic device power to output force ratio.

In one specific embodiment, a piston may have a diameter between about 30 mm and 50 mm. The piston may also include one or more orifices with a diameter between about 0.3 mm and 1.2 mm, 0.7 mm and 0.9 mm, and/or any other appropriate range of diameters. However, while particular component parameters have been provided above, it should be understood that the current disclosure is not limited to any particular piston, bleed orifice, and hydraulic device configuration as the disclosure is not limited in this fashion.

As described above, the various compliances and flow resistances provided by the different accumulators and flow restrictions described herein may be altered in a number of different ways to control resonance frequencies of different combinations of components, resonances that may occur between different components, and other considerations. For example, the various flow resistances, accumulator compliances, blow off valve opening pressure differentials, and other considerations may be selected to help mitigate: pump ripple from a hydraulic device; cavitation; over speed events of a hydraulic device; resonances between accumulators located on opposite sides of a hydraulic device; resonances between adjacent accumulators located along the same branch of a flow path; a resonance of a piston and piston rod in combination with an associated top mount; and/or any number of other different considerations. Accordingly, it should be understood that the different flow resistances, compliances, and other appropriate physical parameters of these different components may be balanced together to accomplish any one or more of the above stated goals in the embodiments described herein.

Figure 5A:
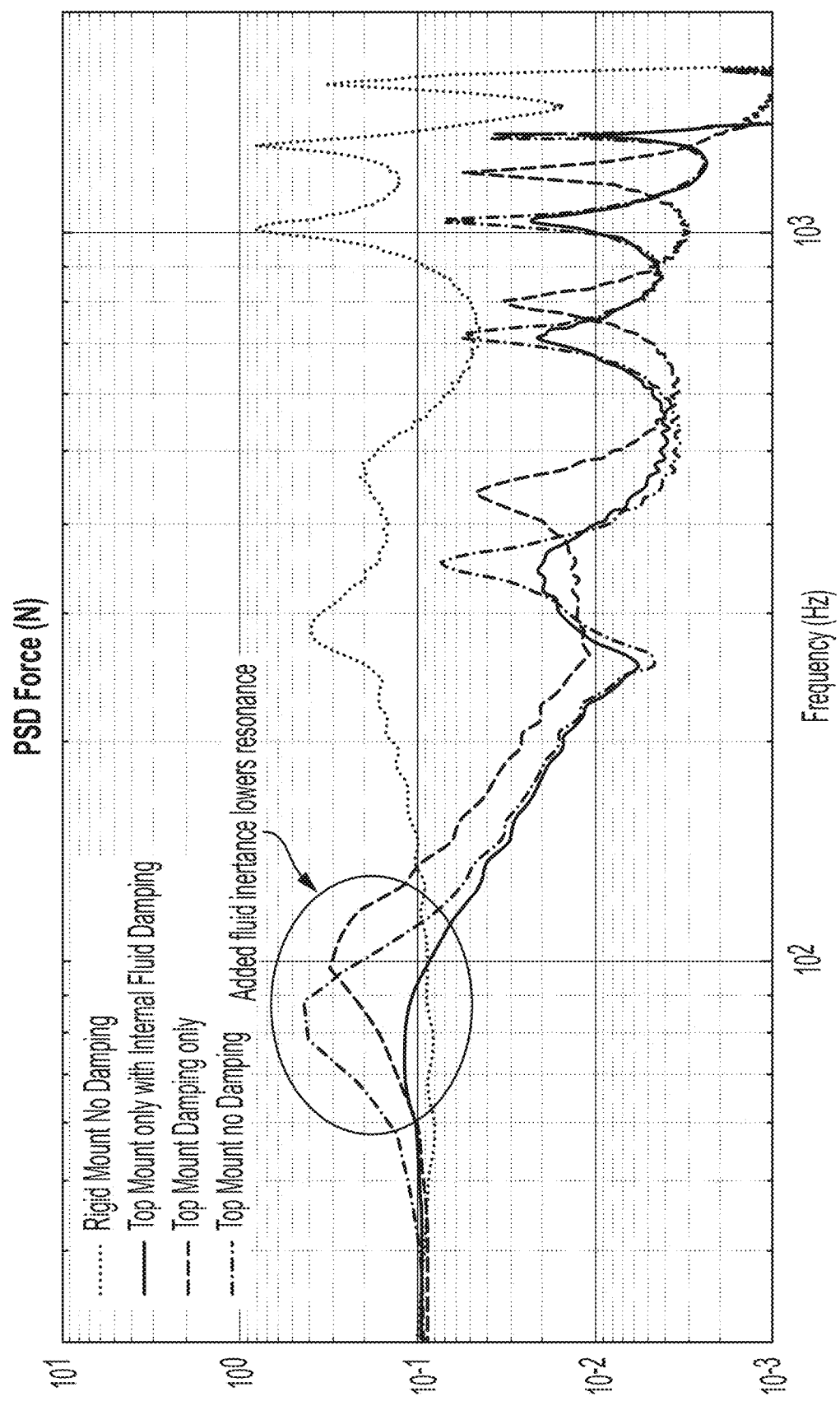
FIG. 5A is a graph of force versus frequency showing top mount resonance, with various degrees of damping.
Figure 5B:
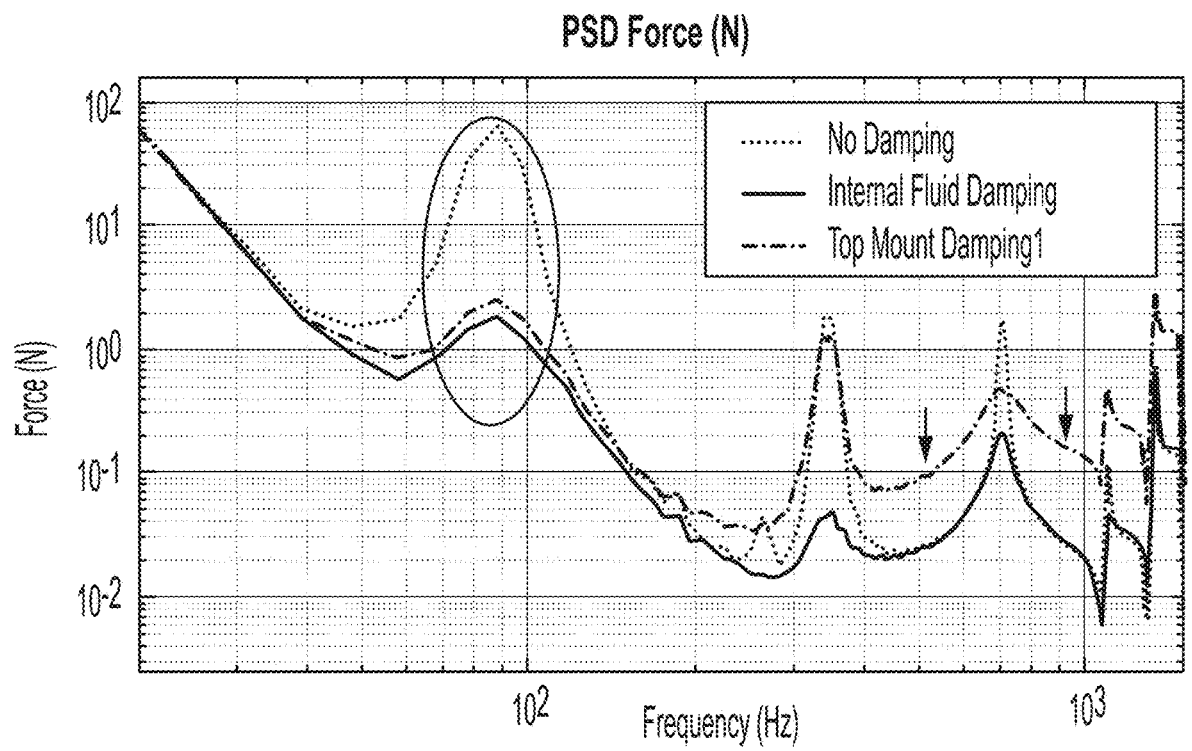
FIG. 5B is a graph of force versus frequency showing damping effects for top mount resonance with only internal fluid damping and only top mount damping.
Figure 5C:
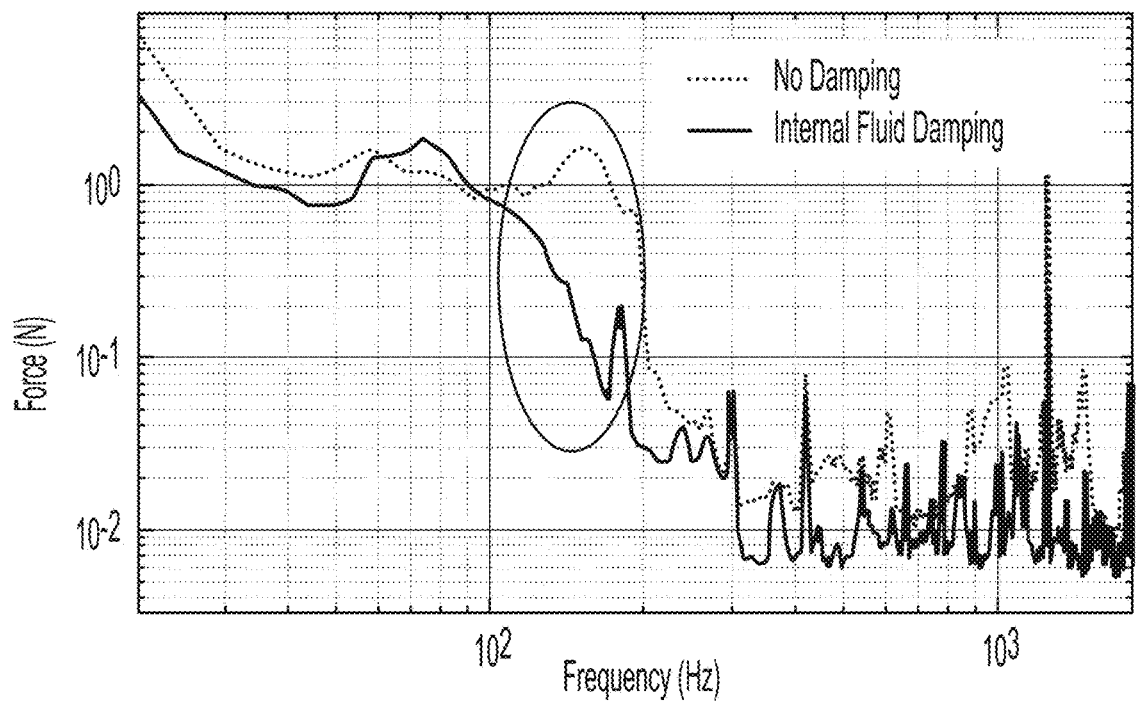
FIG. 5C is a graph of force versus frequency with and without internal fluid damping of a top mount resonance.

FIGS. 5A-5C depict actuator force versus frequency for different actuator constructions and mounting arrangements.

Overall, the results confirm that the tuned system response obtained through the combined use of flow restrictions and system compliances enable actuator responses that exhibit reduced resonances for the piston and improved damping as compared to systems including damping purely in an associated top mount. For example, FIG. 5A depicts results for a rigidly mounted actuator without the described flow restrictions, an actuator connected to a compliant top mount and including the described flow restrictions to provide internal fluid damping, an actuator connected to a compliant top mount without internal fluid damping, and an actuator connected to a compliant top mount. As shown in the figure, the added fluid inertance from the flow restrictions reduces the resonance of the piston and piston rod with the top mount in the highlighted frequency ranges as compared to the other actuator mountings and constructions in addition to providing damping in the higher frequency ranges as well. FIG. 5B presents results for an actuator without damping, an actuator including internal fluid damping, and an actuator including damping from a compliant top mount connected to the actuator. In addition to showing a reduced resonance of the piston and piston rod with the top mount, the actuator including internal fluid damping exhibits improved damping at higher frequencies due to the internal roll-off frequency behavior of the flow restrictions described above. Accordingly, as indicated by the arrows in the figure, the internal fluid damping provides improved damping characteristics as compared to providing damping purely in a top mount attached to the actuator. FIG. 5C shows test data of the resonance of a piston and piston rod with a top mount for actuators with and without internal fluid damping. As shown in the figure, the actuator including additional fluid damping from the inclusion of flow restrictions exhibits a reduced resonance in the highlighted frequency range.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An actuator comprising:
   a housing including a first volume and a second volume with a piston slidably disposed between the first volume and the second volume;
   a hydraulic device fluidly coupled to the first volume and the second volume along a first flow path extending between the first volume and the second volume, wherein in a first operating mode the hydraulic device operates in a first direction and in a second operating mode the hydraulic device operates in a second direction;
   an electric motor/generator operatively coupled to the hydraulic device;
   a first accumulator disposed along the first flow path between the hydraulic device and the first volume;
   a second accumulator disposed along the first flow path between the hydraulic device and the second volume; and
   at least one flow restriction located along the first flow path, wherein the at least one flow restriction is configured to damp a flow in the first flow path between the first accumulator and the second accumulator.

2. The actuator of claim 1, wherein the at least one flow restriction is positioned between the first accumulator and the first volume or the second accumulator and the second volume.

3. The actuator of claim 1, wherein the at least one flow restriction includes a first flow restriction located between the first accumulator and the first volume and a second flow restriction located between the second accumulator and the second volume.

4. The actuator of claim 1, wherein the housing comprises a twin tube housing including an inner tube and a concentrically located outer tube wherein the at least one flow restriction is formed by an annular gap between the inner tube and the concentrically located outer tube.

5. The actuator of claim 1, wherein the at least one flow restriction is constructed and arranged to damp frequencies between or equal to 75 Hz and 150 Hz.

6. The actuator of claim 1, wherein the first accumulator is a first flow through accumulator.

7. The actuator of claim 1, wherein the second accumulator is a flow through accumulator.

8. The actuator of claim 1, wherein the second accumulator is a single port accumulator.

9. The actuator of claim 8, wherein an inlet to the single port accumulator is constructed and arranged to function as a low pass filter.

10. The actuator of claim 9, wherein the inlet to the single port accumulator comprises a shimstack.

11. A vehicle comprising:
an active suspension system including one or more actuators, wherein each actuator comprises:
a housing including a first volume and a second volume with a piston slidably disposed between the first volume and the second volume;
a hydraulic device fluidly coupled to the first volume and the second volume along a first flow path extending between the first volume in the second volume, wherein in a first operating mode the hydraulic device operates in a first direction and in a second operating mode the hydraulic device operates in a second direction;
an electric motor/generator operatively coupled to the hydraulic device;
a second flow path extending between the first volume and the second volume that bypasses the hydraulic device; and
a valve that selectively permits flow through the second flow path based at least partly on the vehicle's speed, wherein the valve permits flow through the second flow path when the vehicle velocity is less than a threshold velocity and prevents flow through the second flow path when the vehicle velocity is greater than the threshold velocity.

12. The vehicle of claim 11, wherein the threshold velocity is between 20 miles per hour and 30 miles per hour.

13. The vehicle of claim 11, further comprising at least one flow restriction disposed along the second flow path.

14. The vehicle of claim 13, further comprising a first accumulator disposed along the first flow path between the hydraulic device and the first volume and a second accumulator disposed along the first flow path between the hydraulic device and the second volume.

15. The vehicle of claim 14, wherein the at least one flow restriction is constructed to damp a flow between the first accumulator and the second accumulator.

* * * * *